United States Patent [19]

Itoh

[11] Patent Number: 5,396,484
[45] Date of Patent: Mar. 7, 1995

[54] DIVERSITY COMMUNICATION METHOD OF TIME-DIVISION, TIME-COMPRESSED MULTIPLEXING TELEPHONE SIGNAL FOR MOBILE COMMUNICATION SYSTEM

[75] Inventor: Sadao Itoh, Kanagawa, Japan

[73] Assignee: Iwatsu Electric Co., Ltd., Tokyo, Japan

[21] Appl. No.: 913,634

[22] Filed: Jul. 16, 1992

[30] Foreign Application Priority Data

Jul. 18, 1991 [JP] Japan .................. 3-204009

[51] Int. Cl.[6] .................... H04B 7/12; H03C 5/00; H03K 7/10
[52] U.S. Cl. ........................ 370/11; 370/109; 375/267; 375/347
[58] Field of Search ............... 370/7, 11, 109, 114, 370/118, 80, 81, 122, 95.1, 95.3; 375/122, 40, 100; 455/33.1, 33.4, 50.1, 53.1, 54.1, 56.1; 379/58, 59, 60

[56] References Cited

U.S. PATENT DOCUMENTS 4,217,467  8/1980  Kobayashi et al. ............. 370/11
5,121,391  6/1992  Paneth et al. .................. 370/109
5,249,174  9/1993  Itoh ............................... 370/109

OTHER PUBLICATIONS

Technical Report of Institute of Electronics, Information and Communication Engineers, pp. 1–5, RCS 89–11, Jul. 24, 1989, Ito, "System Design of Portable Telephones, —A Proposal Of Time-Division, Time Compressed Multiplexing FM Mobile Radio System".
Technical Report of Institute of Electronics, Information and Communication Engineers, pp. 1–6, RCS 89–47, Jan. 18, 1990, S. Ito, "System Design Of Portable Telephones, —Theoretical Analysis Of Multipath Propagation Characteristics Of Time-Division, Time-Compressed Multiplexing FM Mobile Radio System".
Technical Report of Institute of Electronics, Information and Communication Engineers, pp. 49–56, RCS 89–65, Mar. 28, 1990, S. Ito, "Theoretical Analysis of Non-Simultaneous Load Advantage Of Time-Compressed Multiplexing Telephone Signal and Application To FM Mobile System".
Proceedings of the 40th IEEE Vehicular Technology Conference, May 6–9, 1990, pp. 220–225, S. Ito, "A Proposal Of Time-Division, Time-Compressed Multiplexing FM Mobile Radio System".
Proceedings of the 41st IEEE Vehicular Technology Conference, May 19–22, 1991, pp. 910–915, S. Ito, "A Proposal For Cellular Mobile Radio System Using Frequency Modulated Time-Compression Multiplexed Telephone Signal".
IEEE, pp. 562–565, Feb. 1992, S. Ito, et al., "An Experiment In The Existential Evidence Of The Gain Improvement Factor Theorem In Time-Division, Time-Compressed Multiplex Mobile Telephonic System".

Primary Examiner—Wellington Chin
Attorney, Agent, or Firm—Oblon, Spivak, McClelland, Maier & Neustadt

[57] ABSTRACT

In a mobile communication system in which signals are temporally compressed into time slots of a frame structure, a composite signal such as a telephone signal or data signal is hybrid-modulated using the same radio carrier wave, whereby diversity transmission/reception are available. The telephone signal is frequency-modulated using a single time slot of a single radio communication channel which has been allocated between a mobile transceiver and a radio base station. The frequency-modulated signal is again amplitude-modulated by the same telephone signal so that diversity transmission/reception is available.

3 Claims, 14 Drawing Sheets

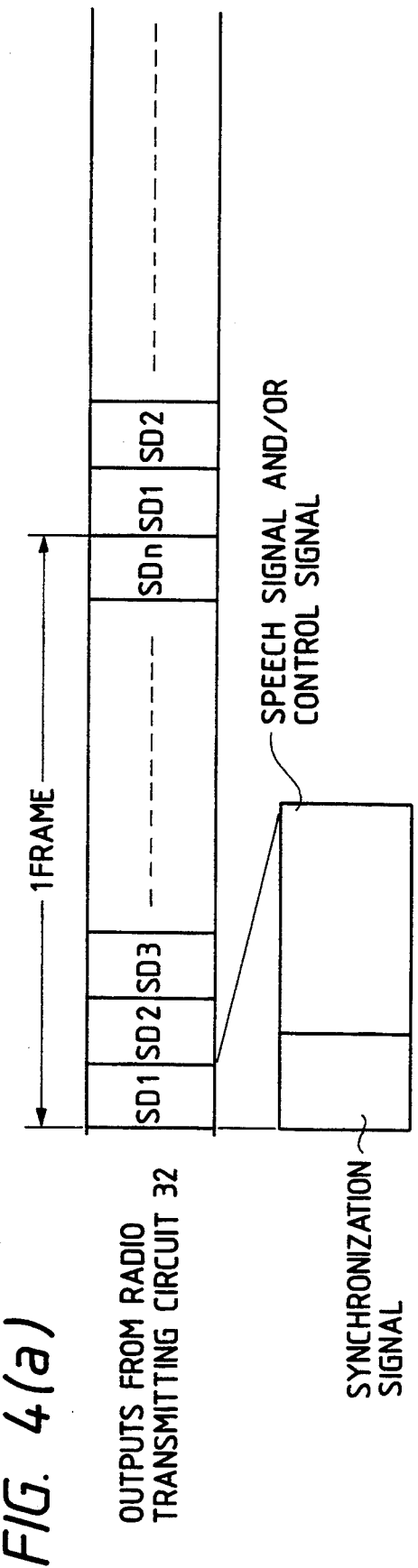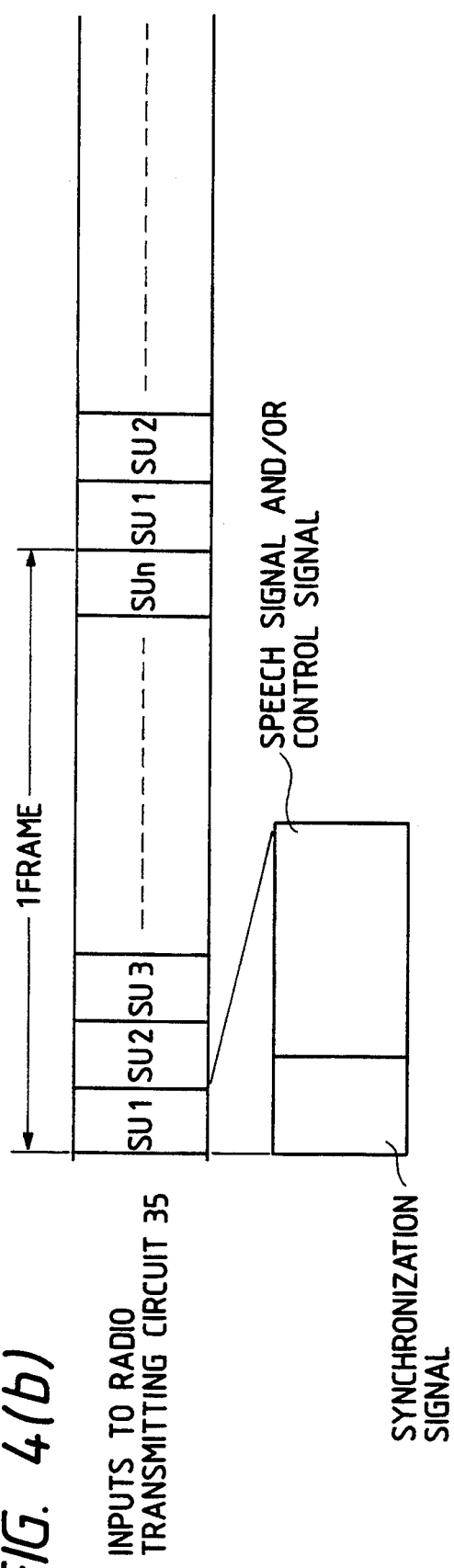

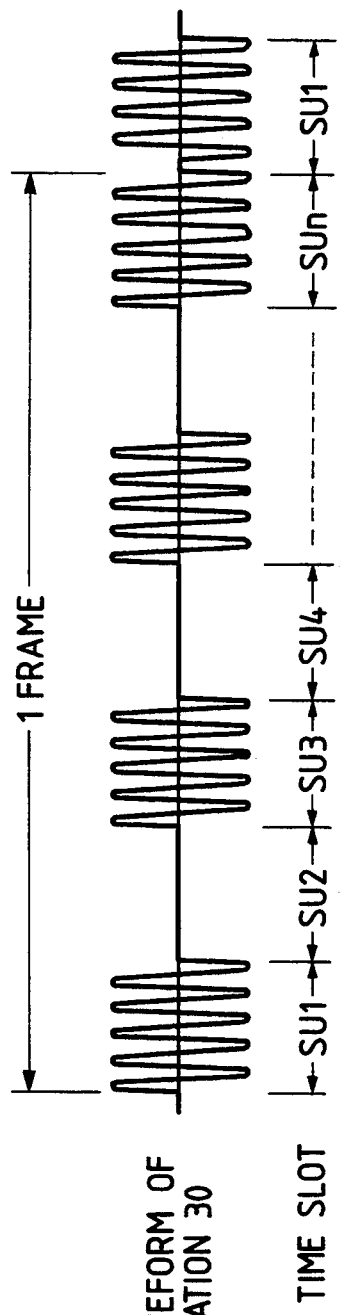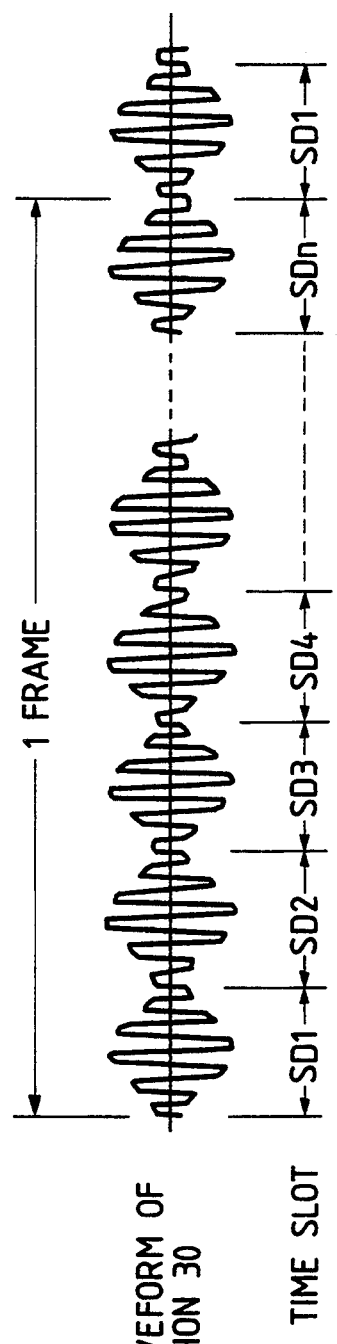
FIG. 7(a) RECEPTION WAVEFORM OF RADIO BASE STATION 30
FIG. 7(b) TRNSMITTING WAVEFORM OF RADIO BASE STATION 30

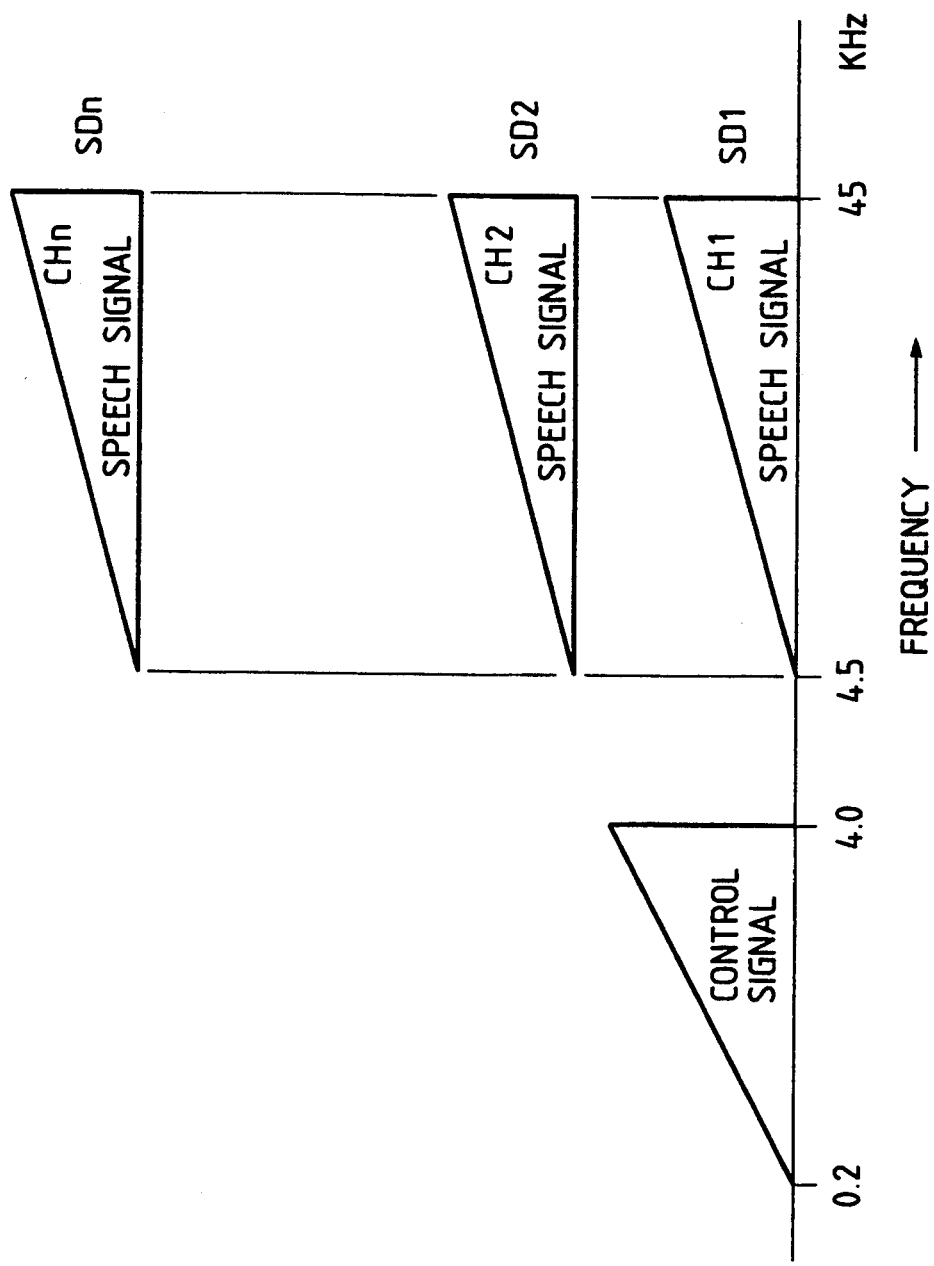

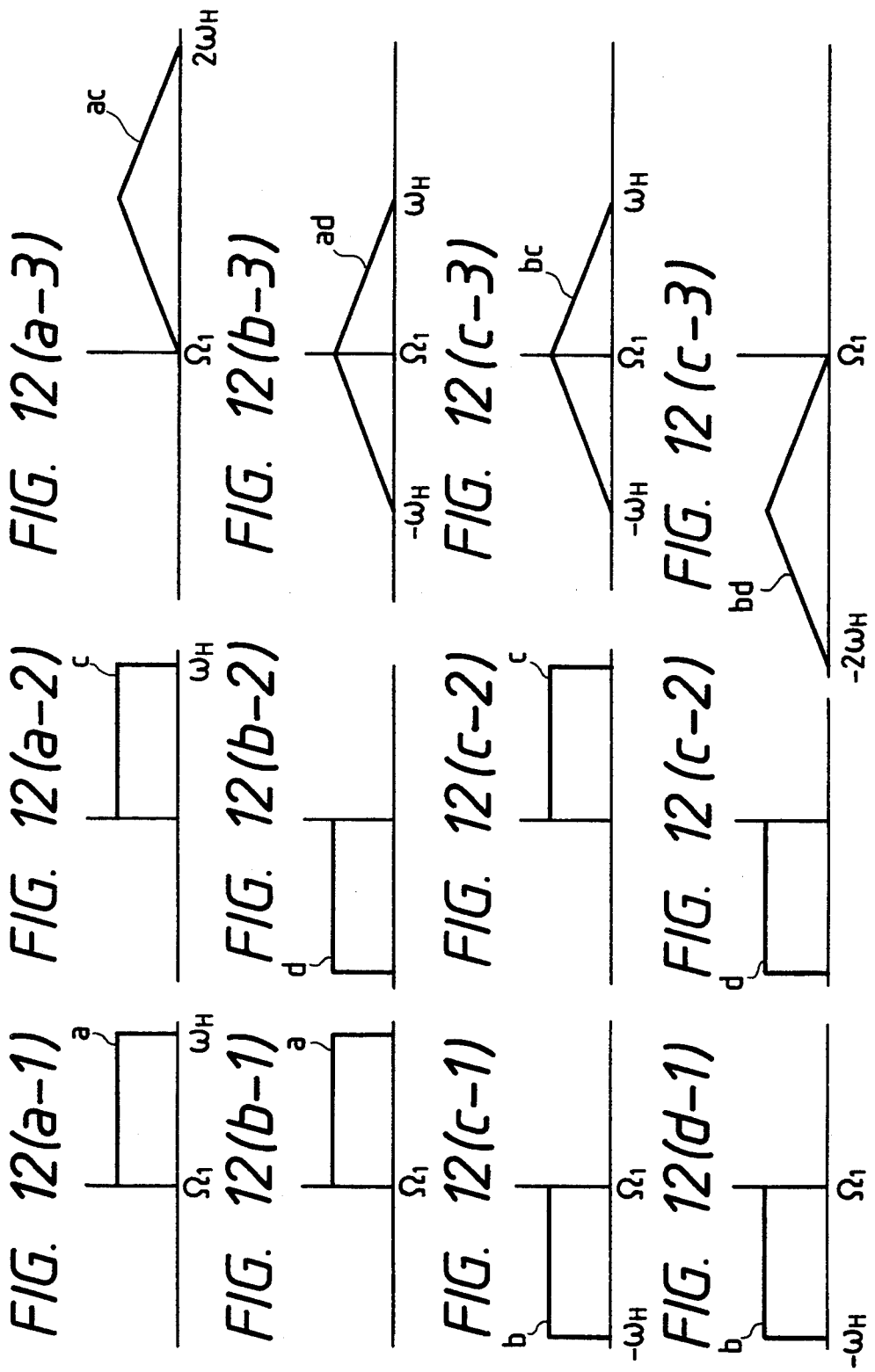

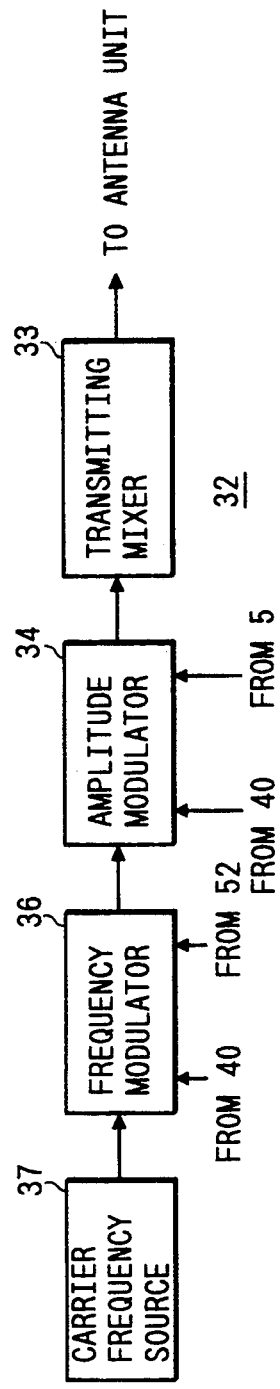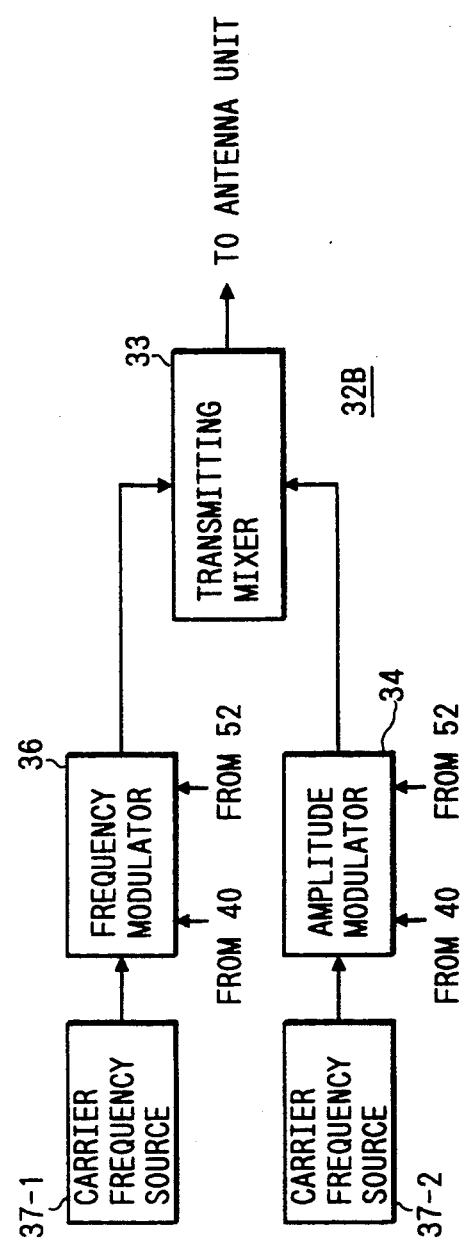

DIVERSITY COMMUNICATION METHOD OF TIME-DIVISION, TIME-COMPRESSED MULTIPLEXING TELEPHONE SIGNAL FOR MOBILE COMMUNICATION SYSTEM

BACKGROUND OF THE INVENTION

The present invention generally relates to a diversity communication method in a mobile communication system among a radio base station and mobile transceivers used in time-division time-compressed multiplexing telephone or data signals for radio communication channels (hereinafter referred to as a "TCM communication system"). More specifically, the present invention is directed to a diversity communication method for a TCM communication system in which a certain radio channel is given among a number of radio channels provided for the communication system. If one mobile transceiver among a large quantity of mobile transceivers within a service area establishes communication with a corresponding radio base station using a given radio channel, time slot in each frame and communication signal by setting a radio communication line therebetween by way of, for instance, a telephone signal, and if another mobile transceiver attempts to establish communication by utilizing the same radio channel, but different time slot in the frame, an independent radio communication line is set up using the same radio channel but different time slot in the frame between the last-mentioned mobile transceiver and the above-described radio base station without causing an adverse influence on the communication already established between the first-mentioned mobile transceiver and the radio base station. As a result, various signals such as telephone signals, facsimile signals and data signals can be communicated through the same radio communication channel. In mobile communication systems using voice transmission to which a cellular system has been applied, the method for utilizing a multiplex signal which has been time-divided and time-compressed has been described in the following publications:

Publication No. 1: S. ITO, "System Design of Portable Telephones,—A Proposal for Time-division/Time-compression FM mobile Radio System—", Technical Report of "Institute of Electronics, Information and Communication Engineers", RCS 89-11, July 1990.

Publication No. 2: S. ITO "System Design of Portable Telephones,—Theoretical Analysis of Multipath Propagation characteristics of Time-division, Time-compression Multiplexing FM Mobile Radio System—", Technical Report of "Institute of Electronics, Information and Communication Engineers", RCS 89-47, January 1991.

Publication No. 3: S. ITO "Theoretical Analysis of Non-Simultaneous Load Advantage of time-division, time-compression multiplexing telephone signal, and Application to FM mobile System", Technical Report of Institute of Electronics, Information and Communication Engineers, RCS 89-65, March 1992.

In publication No. 1, the following system has been reported. A transmission signal (baseband signal) is segmented using a predetermined time interval, and then the segmented baseband signals are stored in a storage circuit. When these signals are to be read out, they are read out to a predetermined time slot at a speed "n" times higher than the storage speed. A carrier wave is angle-modulated or amplitude-modulated by the signals contained in this time slot and radio receiving circuits each having a receiving mixer, radio transmitting circuits each having a transmitting mixer, and switching circuits provided for a synthesizer applied to the receiving mixer of the radio receiving circuit and also for a synthesizer applied to the transmitting mixer of the radio transmitting circuit are employed and built into the mobile transceiver and the radio base station in order to send/receive the signal in a temporal interrupt mode. The outputs of these synthesizers are interrupted, where this interrupt state is synchronized for both transmission and reception. Also, the method for synchronizing the interrupt transmission/reception is also applied to the radio base station communicated with the radio transceiver. At the reception side, to derive only the signals stored in the above-described time slot, the radio receiving circuit is opened/closed so as to receive the signals, and the modulated signals are stored in the storage circuit so that when the stored signals are read out therefrom, the baseband signals corresponding to the transmitted original signal can be reproduced by reading out these signals at a low speed equal to 1/n times the storing speed.

Also, in publication No. 2, there have been proposed considerations of adverse influences in multi-path fading caused by the TCM signal during space transmission, and a guard time is set between the time slots in order to reduce or mitigate this adverse influence.

Furthermore, in publication No. 3, it is revealed that a multiplex load gain similar to that of the conventional FDM (frequency division multiplex system) signal is present in the time division/time compression multiplex system (TCM system), and also the quantitative idea and the system operation thereof are described. Then, when this multiplex load gain is used with deep FM modulation, the transmission power can be considerably lowered, and thus a considerable power saving may be achieved in the mobile transceivers.

However, there is no description with respect to the signal transmission in these conventional systems, concerning methods to overcome the adverse influences caused by fading which occurs when the signals are transmitted through the transmission medium, especially a space such as the transmission diversity. Also, in such a communication system where the radio communication line is set by the radio base station and the corresponding mobile transceiver is set using the telephone signal, there is no discussion in any of these publications of a case where the same carrier wave is hybrid-modulated by the same signal, i.e., in conventional systems, angle modulation and amplitude modulation are performed using two different signals. In other words, angle modulation on one signal and amplitude modulation on another signal, or amplitude modulation on the one signal and angle modulation on the other signal are performed. Thus, there exists a need for communication which is established using a hybrid-modulated wave which has advantages over the prior art systems.

In the conventional systems, when the radio communication lines are set by the radio base station and a large number of transceivers attempt to establish communication by utilizing, for instance, a TCM-processed telephone signal, in order to improve qualities of the signals to be transmitted, if a transmission diversity system (it is assumed that the multiplexing number is selected to be 2) is used, there are the following drawbacks in the utility of frequencies. First, the number of frequencies required in the frequency diversity system becomes two times larger than that required by a non-diversity type conventional system. Also, in a transmission diversity system (it is assumed that the number of multiplex is selected to be 2), even if the number of frequencies used is the same as that of a non-diversity system, the required transmission time will be two times longer than that of the non-diversity system. As a result, the effective ratio of the frequency is reduced to only one-half, a significant drawback in the art.

SUMMARY OF THE INVENTION

In accordance with a modulation system of the present invention, such a hybrid modulation is employed, whereby the same carrier wave is angle-modulated by a TCM-processed telephone signal and is also amplitude-modulated by the same TCM-processed telephone signal, so that the frequencies used in this modulation system are effectively utilized, and whereby diversity effects are obtained.

Also, depending upon the types of signals, there are certain possibilities that the expansion of the sideband in the hybrid modulated signal may be wider than that of the single modulated signal caused by either angle modulation or amplitude modulation alone. In this case, a bandpass filter is employed at the output side of the hybrid modulated signal, so that the expansion of this sideband may be suppressed to be the same as the sideband of a single signal which has been angle modulated or amplitude modulated. As a consequence, the radio interference of neighbor channels can be prevented, and the frequencies thereof can be effectively utilized. In this manner, and as will be described in detail below, the present invention obtains significant advantages.

When the communication is established by setting the respective radio communication lines by means of the radio base station and a large number of mobile transceivers (it is assumed that "n" mobile transceivers are employed), TCM signals transmitted from the radio base station are produced as follows. After a TCM signal has been produced from "n" telephone signals transmitted from the telephone network to the radio base station, the TCM signal is divided into two signals, whereby two sets of TCM-processed telephone signals are produced. By using these TCM-processed telephone signals, both angle modulation and amplitude modulation are carried out on the same carrier wave, and this hybrid-modulated wave is then transmitted to a larger number of mobile transceivers. On the other hand, in a majority of the mobile transceivers, this hybrid-modulated wave is received in accordance with time slots allocated to the individual transceivers, and the received signal is then demodulated in accordance with a process opposite to the process used to modulate the hybrid modulated signal.

Furthermore, with respect to the hybrid-modulated signal transmitted from the mobile transceivers to the radio base station, after the telephone signal has been time-compressed in accordance with the same time compression value used in the radio base station, and thereafter divided into two signals, both angle modulation and amplitude modulation, similar to those performed in the radio base station, are carried out on the same carrier wave using these divided telephone signals based upon the time slot allocated thereto. Thereafter, the resultant hybrid-modulated signal is transmitted to the radio base station in a system arrangement which will be explained later.

A plurality of radio base stations including radio transceivers, and also the mobile transceiver devices, comprise a radio receiving circuit having a receiving mixer to communicate with the radio base stations, while being moved within a service area covered by said plurality of radio base stations. A radio transmitting circuit having a transmitting mixer, and a selective receiving means, having a frequency synthesizer capable of selectively receiving only a signal at a timing given to the receiving mixer of the radio receiving circuit, are also provided. Further, a selective transmitting means, having a frequency synthesizer capable of selectively transmitting a signal only at a timing given to the transmitting mixer of the radio transmitting circuit, is included. A transmission signal (a hybrid signal such as a telephone and facsimile signal) is time-segmented by a predetermined time interval, thereby being stored in a storage circuit.

When the time-segmented signals are read out from the storage circuit, the reading speed is selected to be "n" times higher than the storing speed in the storage circuit at a predetermined time slot. The carrier wave is either angle-modulated or amplitude-modulated by a TCM-processed telephone signal stored at this time slot, and the resultant modulated signal is then again modulated by the other of amplitude-modulation, or angle-modulation by the identical TCM-processed telephone signal. The inventive system also includes a radio receiving circuit having a radio mixer and a radio transmitting circuit having a transmitting mixer. Also provided are a switch circuit for a frequency synthesizer applied to the receiving mixer of the radio receiving circuit, and a frequency synthesizer applied to the transmitting mixer of the radio transmitting circuit, which have been built into the mobile transceivers and the radio base station in order to transmit/receive the signals in the temporal interrupt mode. Then, the outputs of the respective frequency synthesizers (say simply synthesizers) to be applied are interrupted. This interrupt state is in synchronism with the transmission/-reception operations. Also, the above-described interrupt transmission/reception operations are employed in the mobile transceivers communicating with the radio base station, which are synchronized with those of the radio base station. To derive only the signals stored at the predetermined time slots at the receiving side, the radio receiving circuit is opened/closed for the signal reception purpose.

The signal which has been obtained by demodulating the signal in accordance with the process opposite to that performed during signal transmission, is stored in the storage circuit. When the stored signal is read out, the reading speed thereof is selected to be 1/n times the storing speed of the storage circuit. In the radio base station a communication path control means is used to set the communication paths with a predetermined mobile transceiver using a preselected time slot, whereby the transmitted baseband signal corresponding to the original signal can be reproduced in both the radio base station and the mobile transceiver. Also a system including a gateway switching system for connecting the general telephone network and the radio base station can be established.

As is well known, a large number of mobile transceivers exist within the service area and the radio base station. In order for a preselected number of mobile transceivers to be able to communicate with the radio base station, the modulating signals of a single radio channel are subdivided into a plurality of time slot series in discrete time increments, and one of these time slot series is selected to be used in the communication. While one mobile transceiver communicates with the radio base station using the hybrid signal, if a second mobile transceiver attempts to access the radio base station so as to establish another signal communication, an unused time slot among the time slot series is given to the second mobile transceiver using the composite signal on the radio communication channel already under use. Accordingly, it is possible to execute diversity communication where the second mobile transceiver can communicate with the radio base station without causing interference to other communications and also without receiving any interference caused by the other communications.

Furthermore, while a single radio base station is communicating with a radio transceiver by utilizing a single time slot (1 time slot of old channel) within a single channel, this mobile transceiver communicates with another radio base station which can satisfy a predetermined communication quality, also using a single time slot (1 time slot of a new channel) within another channel so as to maintain the communication quality and also improve this quality.

A gateway switching system functions as an interface to connect other telephone networks and has a control function for controlling the communication network of the mobile transceivers, in order to determine which communication channel to use for establishing communication between the radio base station and a mobile transceiver, which time slots are to be used, and also when to stop signal transmission.

As a consequence, even when all of the radio channels of the system are being used, if there are empty time slots not being used within the time-divided time slots of the respective radio channels, a calling operation issued by another mobile transceiver is available. Also, telephone conversation can be continued if a mobile transceiver is moved from an adjoining zone. Furthermore, it is possible to perform diversity communication between a mobile transceiver which is communicating with one radio base station, and another radio base station located near the first radio base station.

The modulation method used in the above system is a hybrid modulation method in which the same carrier wave is angle-modulated by a TCM-processed telephone signal and is also amplitude-modulated by the same telephone signal. Since the bandwidth of the modulated signal is limited to a predetermined range by using a bandpass filter, the width of the sideband signal contained in the radio signal may be substantially suppressed to the same bandwidth caused when either angle modulation or amplitude modulation alone is carried out with a single signal.

BRIEF DESCRIPTION OF THE DRAWINGS

FIGS. 4(a) & 4(b) represent a time/slot constructive diagram in a frame for describing time and slot used in the system shown from FIGS. 1 to 3;

FIGS. 7(a) & 7(b) are waveform diagram for showing radio signal waveforms of time/slot in a frame;

FIG. 8 is a spectrum diagram for representing spectrums of time-compressed speech signal/control signal;

FIGS. 12(a-1)–12(a-3), 12(b-1)–12(b-3), 12(c-1)–12(c-3), 12(d-1)–12(d-3) are spectrum diagrams for indicating products between various sorts of signal components and side bands in the radio signal;

FIG. 16 is a detailed circuit arrangement of a ratio transmitting circuit as a constructive element of the radio base station shown in FIG. 3; and, FIG. 17 is a detailed circuit arrangement of another radio transmitting circuit according to a further embodiment, with corresponds to a constructive element of the radio base station shown in FIG. 3.

DETAILED DESCRIPTION OF THE PREFERRED EMBODIMENTS

A description will now be made of the case where an analog telephone signal is TCM (time division/time compression multiplex)-processed and utilized in a system to which the present invention has been applied, in order to explain a principle idea thereof.

Figure 1:
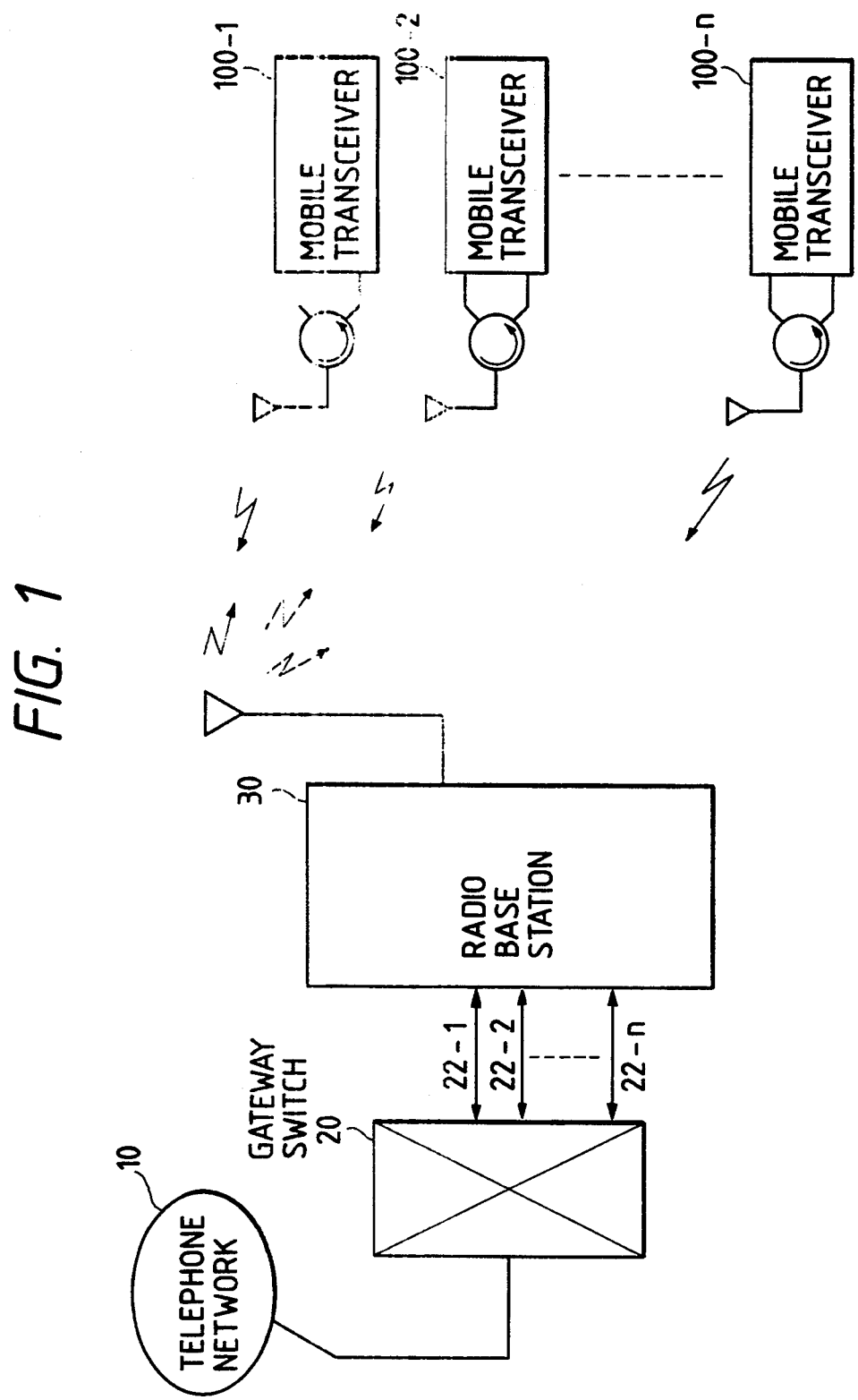
FIG. 1 is a network construction for representing a conceptual arrangement of an overall system according to the present invention.

In FIG. 1, there is shown a system construction of the present invention. In FIG. 1, reference numeral 10 indicates a general telephone network, and reference numeral 20 denotes a gateway-switching system for switching/connecting the telephone network 10 and a radio system. Reference numeral 30 indicates a radio base station comprising an interface with the gateway switching system 20, a circuit for performing time compression of a signal, a circuit for allocating and selecting a given time slot, and a control unit and the like. The radio base station 30 sets and releases a radio line, and includes a radio transmitting/receiving circuit for transmitting/receiving a radio signal with mobile transceivers 100 (100-1 to 100-n). It should be noted that there are transmission lines between the gateway switching system 20 and the radio base station 30, through which the respective speech signals in speech channels CH1 to CHn and the communication signals 22-1 to 22-n containing the control signals are transmitted.

Figure 2:
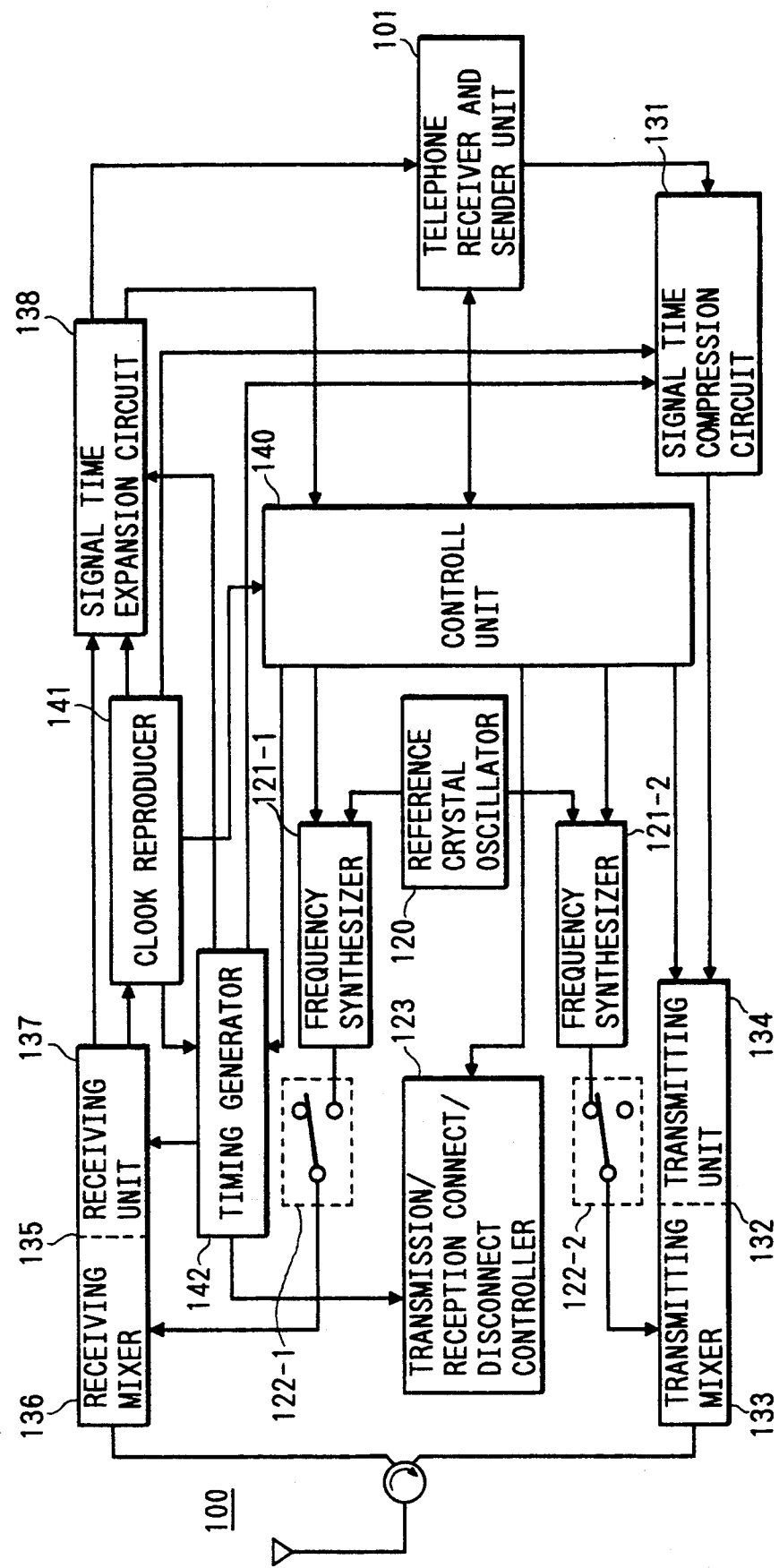
FIG. 2 is a circuit block diagram of a mobile transceiver used to explain a basic idea of the present invention.

To explain a basic concept of the present invention, there is shown in FIG. 2 a circuit arrangement of a mobile transceiver 100 which can communicate with the radio base station 30.

A reception signal such as a control signal and a speech signal, which has been received by an antenna unit, are entered into a radio receiving circuit 135 containing a receiving mixer 136 and a receiving unit 137, and a communication signal corresponding to an output signal from the radio receiving circuit 135 is input to a signal time expansion circuit 138, a control unit 140, and a clock reproducer 141. In the clock reproducer 141, a clock is reproduced from the received signal and is then supplied to the signal time expansion circuit 138, control unit 140 and a timing generator 142.

In the signal time expansion circuit 138, the time compressed signal (in the case of an analog signal, a pitch thereof) contained in the reception signal, which has been compressed and segmented, is recovered as a continuous signal. This continuous signal is then input to a telephone set unit 101 and a control unit 140.

A communication signal output from the telephone set unit 101 is segmented at a predetermined time interval and the signal is compressed (in case of an analog signal, a pitch thereof is compressed) in a signal time compression circuit 131, and then the resultant signals are supplied to a radio transmitting unit 132 including a transmitting mixer 133 and a transmitting unit 134.

An output from a modulator (a hybrid modulator of amplitude and angle in the present invention, but normally either an amplitude modulator or an angle modulator) included in the transmitting unit 134 is converted into a predetermined radio frequency in a transmitting mixer 133, and then transmitted from the antenna unit, to be then received by the radio base station 30. In order to transmit the radio signal toward the radio base station 30, the mobile transceiver 100 uses an available time slot whereby timing information must be derived from a timing generator 142 shown in FIG. 2 via the control unit 140.

In response to a clock from a clock reproducer 141 and the control signal from the control unit 140, where various pieces of timing information are required for a transmission/reception connection/disconnection controller 123, signals from the signal time compression circuit 131 and the signal time expansion circuit 138 are supplied from timing generator 142.

The mobile transceiver 100 further comprises frequency synthesizers 121-1, 121-2, changing switches 122-1, 122-2, a transmission/reception connect/disconnect controller 123 for generating signals to switch changing switches 122-1, 122-2, and a timing generator 142. The synthesizers 121-1, 121-2, a transmission/reception connection/disconnection controller 123 and timing generator 142 which are controlled by a control unit 140. A reference frequency is supplied to the respective synthesizers 121-1 and 121-2 from a reference crystal oscillator 120.

Figure 3:
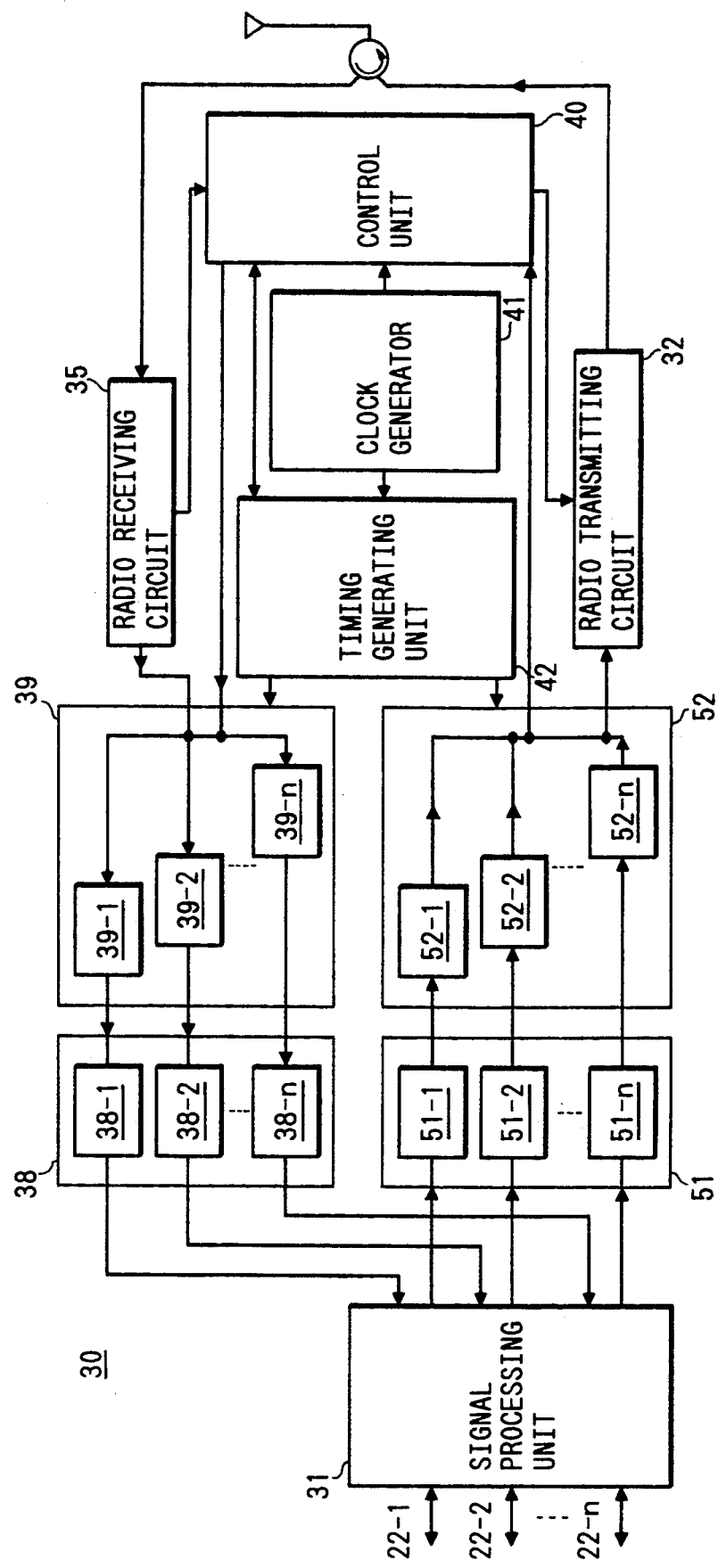
FIG. 3 is a circuit block diagram of a radio base station used to explain a basic idea of the present invention.

In FIG. 3, there is shown the radio base station 30 for explaining a main idea of the present invention. The communication signals 22-1 to 22-n of n channels between the gateway switching system 20 are connected to a signal processing unit 31 constituting an interface on the signal transmission path.

The communication signals 22-1 to 22-n sent from the gateway switching system 20 are input to a signal processing unit 31 of the radio base station 30. In the signal processing unit 31, an amplifier for compensating a transmission loss is employed, and a so-called "2 lines-to-4 lines conversion" is performed. In other words, the input signal is mixed with the output signal and they are subsequently separated from each other in signal processing unit 31, and an input signal from the gateway switching system 20 is sent to a signal time compression circuit group 51. An output signal from a signal time expansion circuit group 38 is transmitted to the gateway switching system 20 using the same transmission path as that for the input signal in the signal processing unit 31. The above-described input signal from the gateway switching system 20 is input into a signal time compression circuit group 51 including a large quantity of signal time compression circuits 51-1 to 51-n, and segmented by a predetermined time interval, and thereafter received by the time (pitch) conversion. The signal transmitted from the radio base station 30 to the gateway switching system 20 is produced as follows. Namely, the output signal from the radio receiving circuit 35 is input via the signal selecting circuit group 39 to the signal time expansion circuit group 38 and then is time-compressed, thereby being input to the signal processing unit 31.

Then, either the control signal or the speech signal outputted from the radio receiving circuit 35 is input to a signal selecting circuit group 39 including the signal selecting circuits 39-1 to 39-n for selecting the input signal into time/slot, in which the communication signals corresponding to the respective communication channels CH1 to CHn are separated. After the compressed signal has been recovered by the signal time expansion circuit group 38 including the signal time expansion circuit 38-1 to 38-n provided in the respective channels, the recovered signal is input to the signal processing circuit 31 so that 4 lines-to-2 lines conversion can be carried out for the recovered signal. Subsequently, the converted signal is sent out to the gateway switching system 20 as the communication signals 22-1 to 22-n.

Next, a description will be made of functions of the signal time compression circuit group 51. In the case that an input signal such as a voice signal and a control signal which have been segmented by a constant time length are stored in a storage circuit and then read out therefrom, it is possible to compress the time length of the signal by changing the reading velocity, for instance, at the reading velocity 15 times higher than the storing velocity. The principal idea of the signal time compression circuit group 51 is the same as that when a voice recorded by a tape recorder is reproduced at a high speed. Practically, for instance, a CCD (Charge-Coupled Device) or a BBD (Bucket Brigade Device) may be used, and various memories employed in television receivers and tape recorders for compressing/expanding a temporal axis of speech may be used as in the publication, "Tape Recorder for Compressing/expanding Temporal Axis of Speech" by KOSAKA et al., NIKKEI ELECTRONICS, Jul. 26, 1976, pages 92 to 133.

As described in the above-mentioned publication, the circuit using CCD or BBD in the signal velocity converting circuit group 51 may be directly used also in the signal time expansion circuit group 38. In this case, upon receipt of the timing signal derived from the timing generator 42 for generating the timing signal in response to the clock input from the clock generator 41 and the timing signal from the timing generator 42, the same result can be achieved by lowering the reading out velocity rather than the writing in velocity.

Either the control signal or the voice signal which has been output from the gateway switching system 20 via signal processing unit 31 is input to the signal time compression circuit group 51, and then is processed by the-signal time (pitch) compression. Thereafter, the time-compressed signal is supplied to a signal allocation circuit 52 for allocating the signal into a time slot.

This signal allocating circuit 52 corresponds to a buffer memory circuit, stores one-segmented high speed signal output from the signal time compression circuit group 51 reads out the signals within the buffer memory based upon the timing information from the timing generating circuit 42 instructed by the control unit 40, and sends the read signal to the radio transmitting circuit 32. As a result, when considering the communication signals in view of channels, these communication signals are time-sequentially arranged in a series form without any overlapping signals. In the case when all of either the speech signals or the control signals are utilized, they have the appearance of a "continuous wave" (as will be described later).

The above-described signals are sent to the radio transmitting circuit 32. Conditions of this compressed signal are shown in FIG. 4, and will now be described.

The signals output from the signal time compression circuit group 51 are input into signal allocating circuit 52, to which a time slot is given as predetermined sequence symbols SD1, SD2, ..., SDn which, in FIG. 4a, indicate that the time-compressed communication signals have been located in accordance with the time slot. It should be noted that a synchronization signal and a speech signal and/or a control signal are contained within a single time slot as shown in the drawing. When the speech signal is not loaded, there is only the synchronization, and an empty slot signal is added to a portion of the speech signal, and also no signal (including a carrier signal) is transmitted in case of a certain system. As shown in FIG. 4a, a signal in which the time slots SD1 to SDn constitute one frame is supplied to a modulation circuit in the radio transmitting circuit 32. After a multiplex signal which has been time-sequentially processed for transmission purposes, and is modulated in the radio transmitting circuit 32 (namely, hybrid modulation of amplitude and angle modulating systems in the present invention, but either only amplitude modulation or angle modulation in the prior art), the resultant multiplex signal is then transmitted from the antenna unit to a particular location.

Figure 5A:
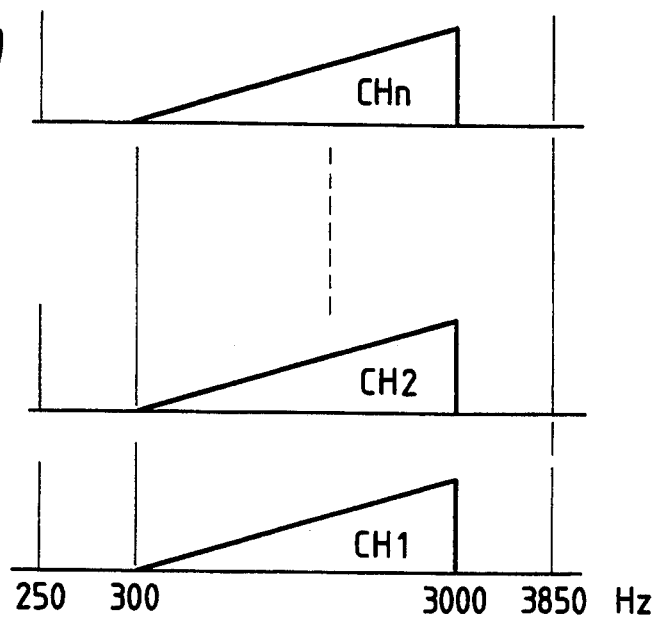
FIGS. 5(a) & 5(b) are a spectrum diagram for showing spectrums of a speech signal and a control signal.
Figure 5B:
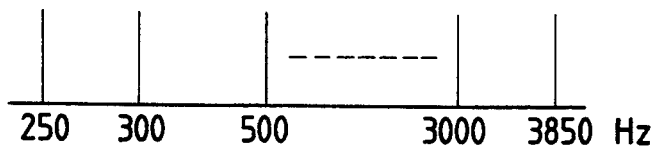

In the telephone calling/receiving operations, the transmission of the control signals performed between the radio base station 30 and the mobile transceiver 100 is possible even when either the control signal within the telephone signal band or the control signal outside-the telephone signal band is utilized. FIG. 5 represents such a relationship among these frequencies. In other words, in FIG. 5(a), there is shown a signal outside the band, and either the signal at the low frequency side (250 Hz) or the signal at the high frequency side (3850 Hz) can be used. This signal is used when, for instance, the control signal is desired to be sent during a telephone conversation. In FIG. 5(b), there is represented an example of a signal within the band which is utilized during the calling/receiving operations. Although any of the above examples corresponds to a case of a tone signal, many kinds of signals may be transmitted at high speed by increasing the number of tone signals and modulating the tone signal to obtain a sub-carrier signal.

Figure 6:
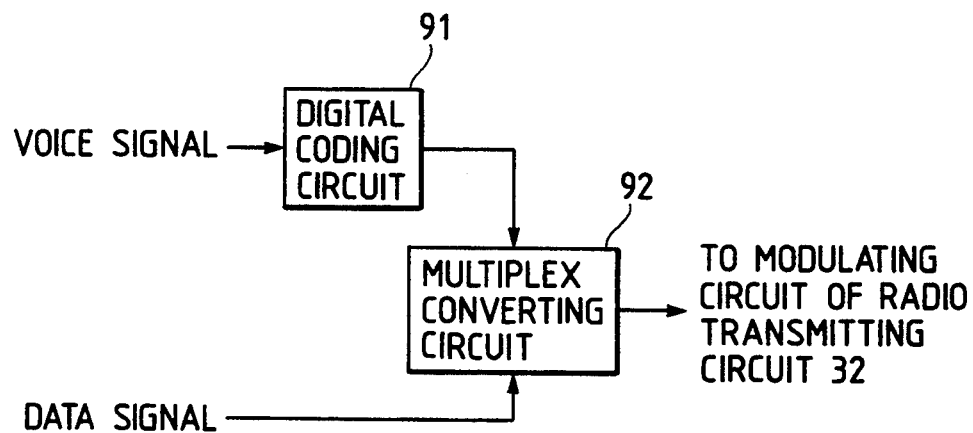
FIG. 6 is a circuit block diagram for multiplexing a voice signal and a data signal.

Although the above-described signals correspond to analog signals, a digital data signal may be transmitted as the control signal in such a manner that a voice signal is also digitally coded, and both the voice signal and the digital data signal are time-divisionally multiplexed in a circuit arrangement as shown in FIG. 6. FIG. 6 shows an example of such a circuit where a voice signal is digitized in a digital coding circuit 91, and then both the digitally coded voice signal and the data signal are multiplex-converted in a multiplex converting circuit 92, and the multiplex-converted signal is supplied to the modulating circuit contained in the radio transmitting circuit 32. It should be noted as to the digital data that there is normally no multiple load gain of an analog signal (as will be described later), and this point should be taken into account in designing the system. Then, when an operation opposite to the operation performed in the circuit of FIG. 6 is carried out in the demodulating circuit of the receiver positioned opposite to this circuit, the voice signal and the control signal may be separately derived.

On the other hand, the signal transmitted from the mobile transceiver 100 is received by the antenna unit of the radio base station 30, and then input into a radio receiving circuit 35. FIG. 4(b) schematically represents this incoming input signal. That is to say, time slots SU1, SU2, SUn indicate transmission signals from the mobile transceivers 100-1, 100-2, ..., 100-n to the radio base station 30. As represented in more detail at the lower left portion of FIG. 4(b), a content of the respective time slots SU1, SU2, SUn is constructed of a speech signal and/or a control signal. It should be noted that a synchronization signal may be omitted, depending upon the signal velocities, or short distance between the mobile transceiver 100 and the radio base station 30. FIG. 7(a) schematically illustrates a waveform of the incoming radio signal shown in FIG. 4(b) within the time slot of the radio carrier wave. Similarly, a waveform of the outgoing transmission signal from the radio base station 30 to the respective mobile transceivers 100 is shown in FIG. 4(a).

The control signal contained in the incoming input signal to the radio base station 30 is directly supplied from the radio receiving circuit 35 to the control unit 40. It should also be noted that after the control signal has been processed similarly to the speech signal, it may be supplied from the output of the signal velocity recovering circuit group to the control unit 40, depending upon a dimension of the velocity converting ratio. Also, the speech signal is applied to the signal selecting circuit group 39. To this signal selecting circuit group 39, the timing signal from the timing generating circuit 43 for producing a predetermined timing is supplied in response to the instruction of the control signal from the control unit 40, the synchronization signal, speech signal, and control signal are separated from each other and then output for each of the time slots SU1 to SUn.

Each of these signals is also input into the signal velocity recovering circuit 38. This circuit functions to perform a reverse conversion of the velocity converting circuit 31 (FIG. 2) in the mobile transceiver 100 at the transmission side, whereby the original signal is accurately reproduced and transmitted to the gateway switching system 20.

The modes of the signal transmitted via a space will now be explained using a relationship between the required transmission band and a neighbor radio channel.

As shown in FIG. 3, the control signal from the control unit is supplied to the radio transmitting circuit 32 in connection with the output from the signal allocating circuit 52. It should be noted that after the control signal has been processed similarly to the speech signal, it may be supplied from the output of the signal allocating circuit group 52 to the radio transmitting circuit 32, depending upon the magnitude of the velocity converting ratio. Subsequently, the mobile transceiver 100 similarly includes a circuit arrangement required when the communication channel of radio base station 30 is selected to be the channel shown in FIG. 2.

A frequency distribution of a signal output from the signal velocity converting circuit group 51 (FIG. 3) when an original signal, for instance, a voice signal (0.3 KHz to 3.0 KHz) has passed through this signal time compression circuit group 51, is represented in FIG. 8. In other words, as previously stated, if the voice signal is converted into a signal 15 times higher than the original signal, a frequency distribution of this resultant signal is expanded to 4.5 kHz to 45 kHz as represented in FIG. 8. It should be noted that although the frequency distribution of the signal is expanded, the waveform itself is not changed at all, but the mode of this waveform is changed, i.e., is subjected to a similar transformation so that the frequency axis thereof has been expanded.

In FIG. 8, there is shown a case where the control signal is simultaneously transmitted using the lower frequency band for the voice signal. It should be understood that both the control signal (0.2 to 4.0 kHz) and the speech signal CH1 (4.5 to 45 kHz indicated as "SD1") among them have been contained in a time slot, for example, SD1. The voice signals contained in other time slots SD2 to SDn are similar to that SD1. In other words, both of the control signal (0.2 to 4.0 kHz and the communication signal CHi (4.5 to 45 kHz have been stored in the time slots SDi (i-2, 3, n). It should also be noted that the signals stored in the respective time slots are time sequentially arranged, and that all of the signals stored in the time slots are not simultaneously supplied to the radio transmitting circuit 32 within the same time period.

When these speech signals are supplied together with the control signal to the angle modulation unit contained in the radio transmitting circuit 32, at least a frequency of $f_c \pm 45$ kHz is required as a desirable transmission band, wherein the symbol "$f_c$" indicates a radio carrier frequency. In the case where there are a plurality of radio channels provided in the system, there is a certain limited value to which the signal velocity can be increased by the signal velocity converting circuit group 51 due to restrictions of these frequency intervals. Assuming now that the frequency intervals of the plural radio channels are "$f_{rep}$", and the maximum signal velocity of the above-described voice signal is "$F_H$", the following inequality must be satisfied:

$$f_{rep} > 2f_H$$

On the other hand, since the voice signal has been normally digitized at a speed of approximately 64 k b/s, the above inequality relationship can also be satisfied, though the scale of the abscissa shown in FIG. 8 in which the description has been made of the analog signal must be read by increasing this scale dimension by about one order of magnitude.

The control signal transmitted from the mobile transceiver 100 to the radio base station 30, is input into the radio receiving circuit 35. A portion of this control signal is input to the control unit 40, and also the remaining signal portion is sent via the signal selecting circuit 39 to the signal velocity recovering circuit group 38. The latter-mentioned control signal is processed by the signal time compression completely opposite to that of signal transmission (i.e., is converted into a low-speed signal), and thereafter the resultant control signal becomes a signal having a velocity similar to that used in the general telephone network 10, which will then be sent via the signal processing unit 31 to the gateway switching system 20.

Next, various operations of the system according to the present invention will be explained in accordance with the following for which the high utility of the present invention will be shown.

(1). CALLING/RECEIVING OPERATIONS
(2). LOGICAL EXPLANATION OF THE PRESENT INVENTION
  (a). MATHEMATICAL EXPRESSION OF MODULATED WAVE
  (b). SPREAD IN SIDE WAVE OF MODULATED WAVE
  (c). CALCULATION ON FREQUENCY UTILITY RATIO
(3). SYSTEM STRUCTURE IN CASE OF COMPOSITE SIGNAL (1). CALLING/RECEIVING OPERATIONS

Figure 9:
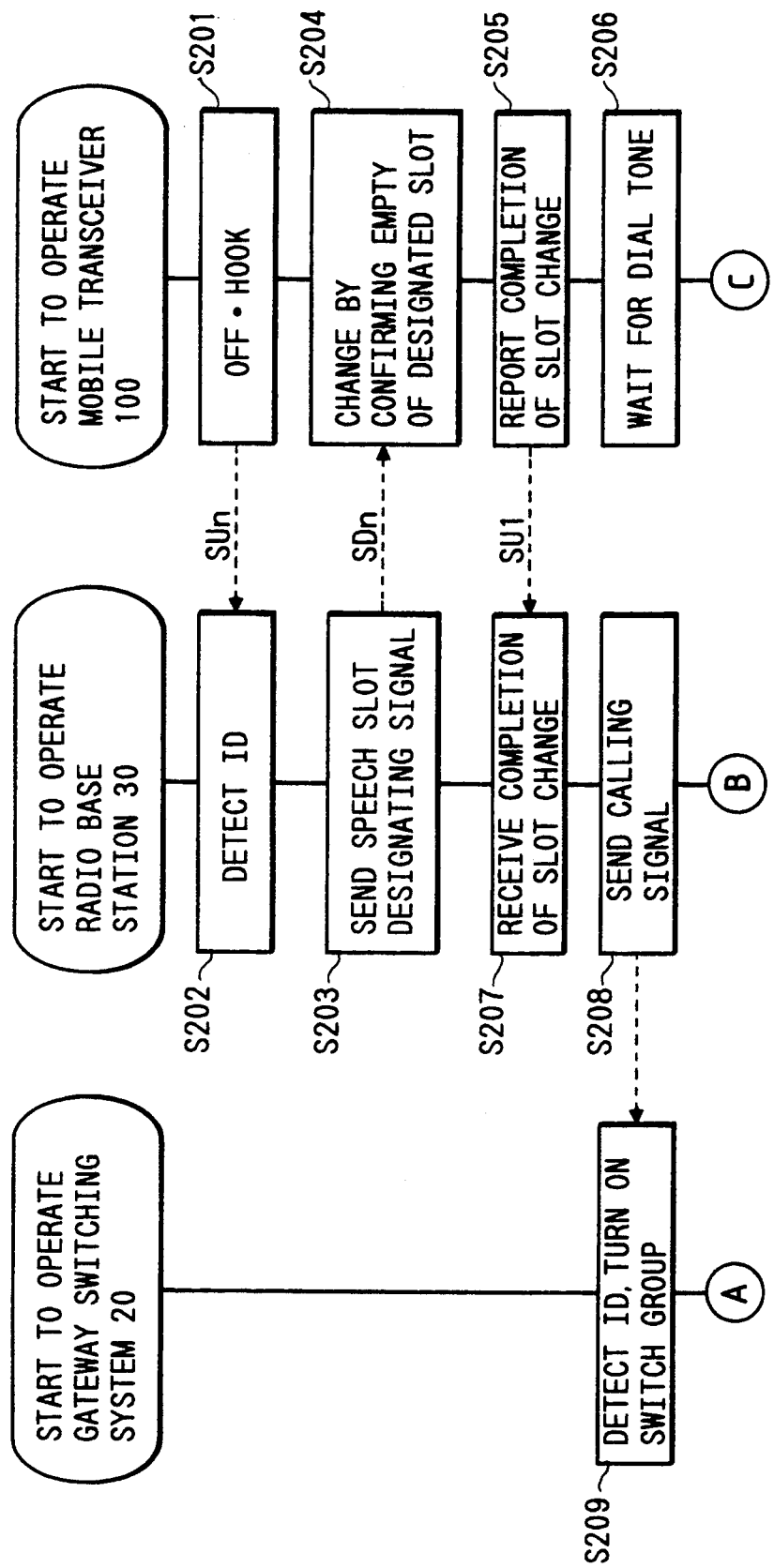
FIG. 9 is a flow chart for showing a mobile to set up call operation flow of the system shown from FIGS. 1 to 3.
Figure 10:
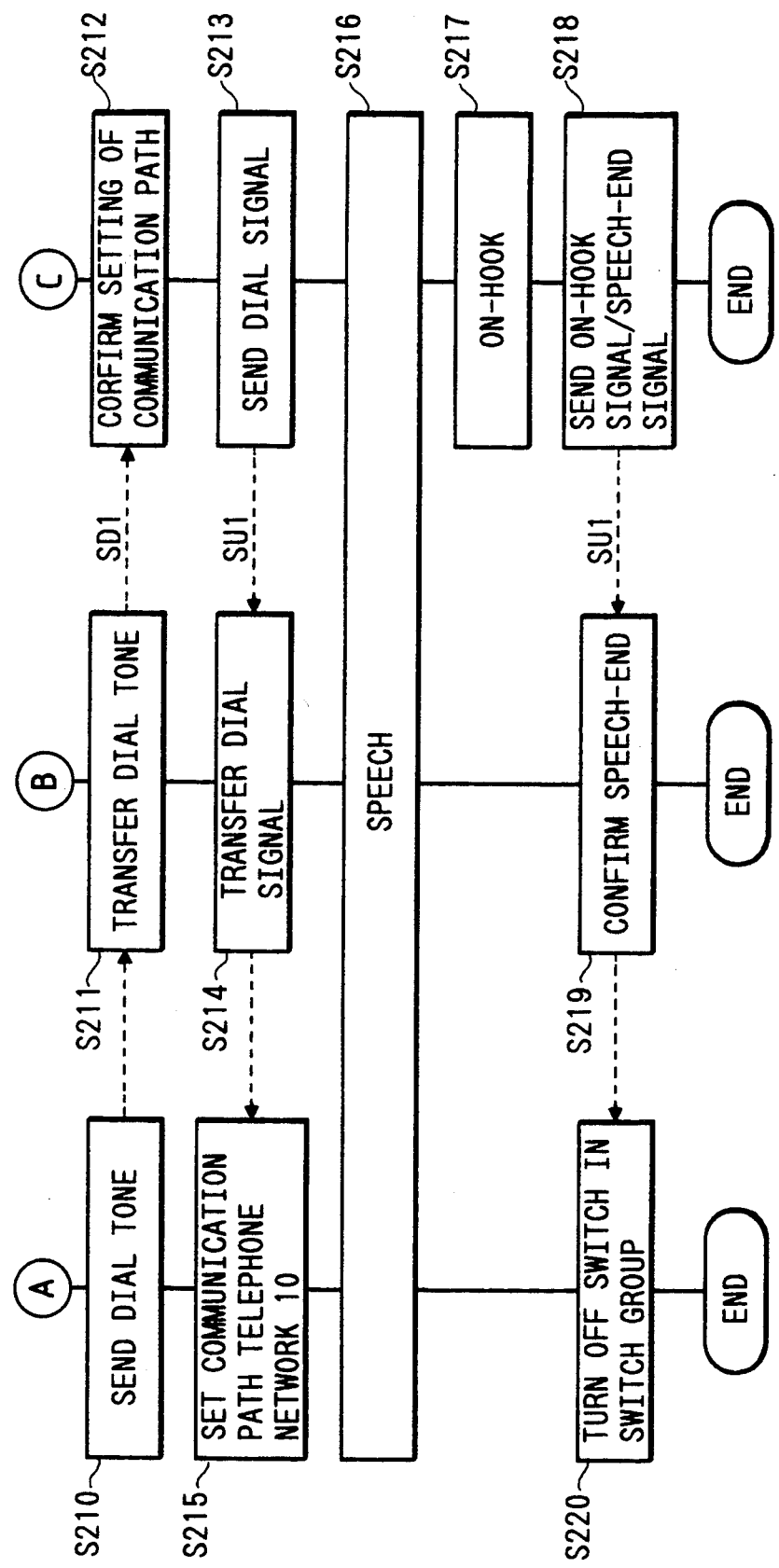
FIG. 10 is a flow chart for representing a mobile to be called operation flow of the system shown in FIG. 9 and FIGS. 1 to 3.

The calling operation will now be described with reference to the flow charts shown in FIGS. 9 and 10.

When the power source of the radio transceiver 100 is turned on, reception of the control signal contained in the outgoing (from the radio base station 30 to the mobile transceiver 100) radio channel (channel CH1 will be assumed) is performed. If a plurality of radio channels are included in the system, the radio channel ("channel CH1") is brought into a receiving condition in accordance with a predetermined procedure or sequence of the system such as:

i). a radio channel indicative of a maximum reception input electric field;
  ii). a radio channel indicated by a control signal contained in the radio signal; and,
  iii). a channel having an empty time slot among the time slots with the radio channel.

This is possible by receiving the synchronization signals contained in the time slots SDn shown in FIG. 4(a). In the control unit 140, the control signal is sent to a synthesizer 121-1 in order to generate a local frequency capable of receiving the signals from the radio channel CH1. Note also that switch 122-1 has been changed to the side of the synthesizer 121-1 and has been set in a fixed condition.

Then, when the telephone set of the telephone unit 101 is set in the "on-hook" state (S201 of FIG. 9), the synthesizer 121-2 shown in FIG. 2 receives from the control unit 140 a control signal that a local frequency capable of transmitting the signals of the radio channel CH1 is generated. Also, switch 122-1 is changed over to the side of the synthesizer 121-2, and is set in a fixed state. Next, a calling control signal output from the telephone unit 101 is output using radio channel CH1. This control signal is transmitted by the frequency band shown in FIG. 8, and by utilizing, for instance, the time slot $SU_n$.

The transmission of this control signal is limited only to the time slot SUn, and is sent in a "burst" mode, and also no signal is output using another time band, so that no adverse influences will affect to other communications. It should be noted that the control signal is transmitted by using the same time slot after one frame, or after a frame subsequent to this frame when the velocity of the control signal is relatively low, or if the control signal is not able to be stored within a single time slot due to a large amount of information contained in the signal.

In order to receive the time slot Slin, the following method is employed. As shown in FIG. 4(a), the synchronization signal and the subsequent control signal are contained in the control signal transmitted from the radio base station 30, and the frame synchronization can be established by receiving this control signal in the mobile transceiver 100. Furthermore, this control signal contains such control information as the time slots which are under use as well as unused time slots (representation of empty time slots and the like. Depending upon the systems, when the time slots SDi (i=1, 2, n) are used for other communications, there exist cases where only the synchronization signal and the speech signal are contained. Even in these cases, normally both of the synchronization signal and the control signal are contained in the unused time slot. Accordingly, it is recognized that the calling signal should be sent out by the mobile transceiver 100 using this unused time slot upon receiving the control signal.

It should be understood that when all of the time slots of a radio channel are being used, a calling operation on this channel is not possible, and thus it is required to search for and scan another channel. In another system, no empty slot representation is made in any of the time slots. In this case, it is necessary to successively search whether or not there are subsequent voice multiplex signals SD1, SD2, SDn to confirm the empty time slot.

Returning to the original discussion point, in the mobile transceiver 100 which has received the control information sent from the radio base station 30 by way of any one of the above-described methods, a determination may be made of whether or not the calling control signal should be transmitted with the time slot. At this point, transmission timing is also judged. Then, assuming that the time slot $SU_n$ for the incoming signal is an empty slot, this empty time slot will be used, and the required timing is derived from the response signal from the radio base station 30 while the calling control signal is sent out, whereby a control signal in a burst mode may be sent out.

If a calling operation is attempted by another mobile transceiver at the same time, since the callings are competing with each other, the calling signals cannot be transmitted to the radio base station 30 under better condition but the operation should be commenced from the beginning. However, the probability of this occurring is sufficiently low. If the competition between callings is further suppressed, the following method is introduced. That is to say, this method is such that assuming that the empty time slot on which the calling operation can be performed is determined by the mobile transceiver 100, all of these time slots are not used, but rather only the first half of the time slots is used by one mobile transceiver, whereas only the second half of the time slots is used by another mobile transceiver. In other words, the used portion of the time slots is subdivided as the calling signal and a large quantity of mobile transceivers can be used. In accordance with this method, even when control signals having different frequencies are transmitted at the same time using a single time slot, no interference occurs in the radio base station 30. The above-described two methods may be separately employed, but if the two methods are combined, the resultant effects can be relatively emphasized.

Assuming now that the calling control signals from the mobile transceiver 100 are received under better conditions by the radio base station 30 and an ID (identification number) of the mobile transceiver 100 is detected (S202), a presently empty time slot is retrieved in the control unit 40. Although the time slot given to the mobile transceiver 100 may be "SUn", the retrieval operation is performed for the sake of confirmation. This is done so as to respond to the simultaneous callings from one mobile transceiver 100 and other mobile transceivers, and to provide a time slot suitable for different types of service or sections of service.

As a result, assuming that time slot SD1 is empty, an instruction is issued to the mobile transceiver 100, by which both the incoming time slot (from mobile transceiver 100 to radio base station 30) SU1 and the outgoing time slot (from radio base station 30 to mobile transceiver 100) SD1 corresponding thereto are utilized in response to the outgoing control signal using the time slot SDn of the above-described radio channel CH1 (S203). In response thereto, the mobile transceiver 100 is moved to a receivable state with the instructed time slot SD1, and selects SU1 (refer to FIG. 4(b)) corresponding to the time slot for the incoming radio channel which is related to the outgoing time slot SD1. At this time, in the control unit 140 of the mobile transceiver 100, the transmission/reception connect/disconnect controller 123 is operated, and the switches 122-1 and 122-2 are started to be operated (S204). At the same time, a signal for completing slot changing is output out to the radio base station using the incoming time slot SU1 (S205) and the transmission of a dial tone (S206) is waited for.

A condition of the time slot SU1 of the radio carrier wave of this incoming radio signal is shown in FIG. 7(a). To the radio base station 32, SU3 and SUn contained in one fame and derived from the other mobile transceiver 100 are transmitted in addition to the time slot SU1. In the radio base station 30 which has received the signal to complete slot changing (S207), the calling signal together with the ID of the mobile transceiver 100 are sent to the gateway switching system 20. To the contrary, in the gateway switching system 20, the ID of the mobile transceiver 100 is detected and the necessary switches among the switch group included in the gateway switching system 20 are turned on (S209). Then the dial tone is output to the radio base station 30 (S210, FIG. 10) and also transmitted from the radio base station 30 to the mobile transceiver 100 (S211). In the mobile transceiver 100, a confirmation is made that the communication path has been set.

When the operation of the mobile transceiver 100 is moved to this condition, since a dial tone is heard by a receiver of the telephone unit 101 transmission of the dial signal is started. This dial signal is time-compressed by the signal time compression circuit 131, and the time-compressed dial signal is output using the incoming time slot from the radio transmitting circuit 132 comprising the transmitting unit 134 and the transmitting mixer 133 (S213). As a result, the transmitted dial signal is received by the radio receiving circuit 35 of the radio base station 30.

In radio base station 30, in response to the calling signal from the mobile transceiver 100, the time slots to be used are provided and both the signal selecting circuit group 39 and the signal allocating circuit group 52 of the radio base station 30 are operated such that a condition where the incoming time slot SU1 is received and the signal of the outgoing time slot SD1 is transmitted has been set. As a consequence, after the dial signal sent from the mobile transceiver 100 has passed through the signal selecting circuit 39-1 of the signal selecting circuit group 39, the resultant dial signal is input to the signal velocity recovering circuit group 38 in which the original transmission signal is reproduced and is then transferred via the signal processing unit 31 as the speech signal 22-1 to the gateway switching system 20 (S214). Also, at this point the communication path to the telephone network 10 is set (Sk-215).

On the other hand, after the input signal from the gateway switching system 20 (namely, a control signal at the beginning, and a speech signal once communication has started, is time-compressed in the signal time compression circuit group 51 of the radio communication station 30, the time slot SD1 is given by the signal allocating circuit 52-1 of the signal allocating circuit group 52. Then, the time-compressed signal is transmitted to the mobile transceiver 100 from the radio transmitting circuit 32 by utilizing the time slot SD1 of the outgoing radio channel. A condition of this time slot SD1 of the outgoing radio carrier wave is shown in FIG. 7(*d*).

The mobile transceiver 100 is set to a waiting condition with respect to the time slot SD1 of the radio channel CH1, the input signal is received by the radio receiving circuit 135 and the output signal thereof is input to the signal expansion circuit 138. In this circuit, the original signal at the transmission side is recovered and the recovered signal is then input to the receiver of the telephone unit 101. Thus, a telephone communication is achieved between the mobile transceiver 100 and a normal telephone set within the normal telephone network 10 (S216).

An end of communication state is achieved by hanging up the receiver of the telephone unit 101 of the mobile transceiver 100 (S217). The "end communication" signal and also the "hang-up" signal from the control unit 140 are output via the velocity converting circuit 131 from the radio transmitting circuit 132 to radio base station 30 (S218), and also the operation of the transmission/reception connection/disconnection controller 132 in the control unit 140 is stopped. Further, the switches 122-1 and 122-2 are fixed to the output terminals of the synthesizers 121-1 and 121-2, respectively.

On the other hand, upon receipt of the "end communication" signal from the mobile transceiver 100, this signal is transferred to the gateway switching system (S219) by control unit 40 of the radio base station 30, and then the switches of the switch group (not shown) are turned off to thereby accomplish the communication (S220) therein. At the same time, the signal selecting circuit group 39 and the signal allocating circuit group 52 employed in the radio base station 30 are released.

In accordance with the above-described descriptions, the transmission of the control signal between the radio base station 30 and the mobile transceiver 100 is not performed using the signal converting circuit group 51 and the signal time expansion circuit group 38 and the like for the sake of easy explanation. However, the control signal may be transmitted through the signal time compression group 51, the signal time expansion circuit group 38 and the signal processing unit 31 in a similar manner as the voice signal, whereby communication can be performed without any problems.

Next, a description will be made of the receiving operation of the mobile transceiver 100. It should be noted that the mobile transceiver 100 is brought into the ON-state, when a power supply thereof is turned on. At this point, as was previously explained with respect to the calling operation from the mobile transceiver 100, the outgoing control signal for the communication channel CH1 is brought into a reception waiting condition in accordance with the sequence predetermined by the system.

It is now assumed that a receiving signal transmitted from the normal telephone network 10 via the gateway switching system 20 to the mobile transceiver 100 is arrived at the radio base station 30. These control signals are transferred as a communication signal 22 through the signal time compression circuit group 51 and the signal allocating circuit group 52 to the control unit 40 (FIG. 3) in a similar manner as that of the voice signal. As a consequence, the ID signal of the mobile transceiver, a display signal of the receiving signal and a time slot signal are output from the control unit 40 using the empty slot, e.g., SD1 among the outgoing time slots of the radio channel CH1 to the mobile transceiver 100 (as to the transmission from the mobile transceiver 100, for instance, the time slot SU1 corresponding to the time slot SD1 is used). In the mobile transceiver 100 which has received this signal, the signal is transferred from the receiving unit 137 of the radio receiving circuit 135 to the control unit 140. In the control unit 140, since a confirmation is made that this received signal corresponds to the receiving signal to the mobile transceiver 100 per se, a calling sound is produced from the telephone unit 101, and at the same time, the transmission/reception connect/disconnect controller 123 is operated in order to wait at the designated time slots SD1 and SU1, and also the ON/OFF operations of the switches 122-1 and 122-2 are commenced. Then it is changed to a state where communication can be performed.

(2). LOGICAL EXPLANATION OF THE PRESENT INVENTION

(*a*). MATHEMATICAL EXPRESSION OF MODULATED WAVE

First of all, an explanation will now be made of the case where no hybrid modulation by either the angle modulation or amplitude modulation is carried out, but rather, only angle modulation is executed. Subsequently, the advantages of composite modulation, according to the present invention, will be described.

Either the data, or the telephone signal (with regard to an analog type signal, or a digital type signal, which corresponds to the output signal (or the control signal) from the telephone unit 101 shown in FIG. 2 may be expressed as follows.

$$\mu(t) = \Sigma a_i \cos(\omega_i t + \Theta_i)$$

where "$\Sigma$" implies a summation of $i = m + 1$. Then, the control signal existing outside the band is expressed by:

$$\mu c(t) = \Sigma a_i \cos(\omega_i t + \Theta_i) \quad (2)$$

where symbol "$\Sigma$" implies a summation of $i = m + 1$ to n; symbol "$a_i$" denotes an amplitude value; symbol "$\omega_i$" indicates an angular frequency; and symbol "$\Theta$" shows a phase when t=0. Further, symbols "m" and "n" indicate positive integers.

Next, a description will be made of the case of frequency modulation. It should be understood that the present invention may be similarly applied to amplitude modulation phase modulation. When a carrier wave is modulated by either equation (1), or equations (1) and (2), the resultant carrier wave is expressed by:

$$I = I_o \sin \int (\omega + \mu(t)) \, dt \qquad (3)$$
$$= I_o \sin (\omega t + s(t))$$

Otherwise, it becomes:

$$I = I_o \sin \int (\omega + \mu(t) + \mu_c(t)) dt \qquad (4)$$
$$= I_o \sin (\omega t + s(t) + S_c(t))$$

It should be noted:

$$s(t) = \Sigma m_i \sin(\omega_i t + \Theta_i)$$

where symbol "$\Sigma$" indicates a total of i=1 to m.

$$S_c(t) = \Sigma m_i \sin(\omega_i t \Theta_i)$$

where symbol "$\Sigma$" denotes a total of i=m+1 to n, and $$m_i = a_i/\omega_i (i = 1, 2, 3, m, n)$$

Then, s(t)+Sa(t) indicated by equation (4) is employed, a radio signal transmitted from the antenna of the mobile transceiver 100 is expressed by the following equation:

$$I = (I_{01}/n)(1 + 2\Sigma\phi^{-1}\sin\phi\cos mpt)\sin\Theta_1 \qquad (5)$$

where $$\phi = m\pi/n$$

$$\Theta_1 \Omega_1 t + s_i(t) + s_{ci}(t)$$

symbol "n" denotes the number of slots within one frame (assuming that the slots are provided under equal time intervals); symbol "" indicates an angular frequency of the carrier wave; symbol "p" is a switching angular frequency; symbol "m" denotes a positive odd number; and symbol "$\Sigma$" shows, a total of m=1 to 00.

Equation (5) represents such a case that the transmission signal from the mobile transceiver 100 using the same radio channel is one slot among "n" slots within a single frame When all of the slots have been packaged by the signals, namely "n" mobile transceivers 100 are communicating with each other using the same radio channel, the signals contained in the radio channels are expressed by the following equations:

$$I = I_1 + I_2 + I_3 + \ldots "I_n \qquad (6)$$

where;

$$I_1 = (I_{01}/n)(1 + 2 \Sigma\Phi^{-1} \sin \phi \cos m p t) \sin \theta_1$$
$$I_2 = (I_{02}/n)(1 + 2 \Sigma\Phi^{-1} \sin \phi \cos m p t_2) \sin \theta_2$$
$$I_3 = (I_{03}/n)(1 + 2 \Sigma\Phi^{-1} \sin \phi \cos m p t_3) \sin \theta_3$$
...

-continued
$$I_n = (I_{0n}/n)(1 + 2 \Sigma\Phi^{-1} \sin \phi \cos m p t_n) \sin \theta_n$$

It should be noted that symbol "$\Sigma$" represents a total of m=1 to $\infty$.
Furthermore, $$t_2 = t - 2 \pi/(n p)$$
$$t_3 = t - 4 \pi/(n p)$$
...
$$t_n = t - 2 (n - 1) \pi/(n p)$$
where;
$$\theta_1 = \Omega_1 t + s_1(t) + s_{c1}(t)$$
$$\theta_2 = \Omega_2 t + s_2(t) + s_{c2}(t)$$
$$\theta_3 = \Omega_3 t + s_3(t) + s_{c3}(t)$$
...
$$\theta_n = \Omega_3 t + s_n(t) + s_{cn}(t)$$

Then, it is determined that symbol "p" indicates a switching angular frequency; symbol "m" denotes a positive odd number; and switching times for "n" input waves are set to an equal time interval.

Since it will be necessary to check adverse influences such as interference occurring in neighbor channels (as will be described later), equation (6) is modified. The right hand of this equation (6) is expanded as follows:

$$I = (I_{01}/n)C_1 + (I_{02}/n)C_2 + \ldots + (I_{0n}/n)C_n \qquad (7)$$

where:

$$c_1 = \sin \theta_{10} + b_{11} \sin \phi_1 + b_{13} \sin \phi_3 + b_{15} \sin \phi_5 + \ldots$$
$$c_2 = \sin \theta_{20} + b_{21} \sin \phi_1 + b_{23} \sin \phi_3 + b_{25} \sin \phi_5 + \ldots$$
...
$$c_n = \sin \theta_{n0} + b_{n1} \sin \phi_1 + b_{n3} \sin \phi_3 + b_{n5} \sin \phi_5 + \ldots$$

Also, the above-described symbols are given:

$$b_{11} = \phi_1^{-1} (\sin \theta_{11p} + \sin \theta_{11n})$$
$$b_{13} = \phi_3^{-1} (\sin \theta_{13p} + \sin \theta_{13n})$$
$$b_{15} = \phi_5^{-1} (\sin \theta_{15p} + \sin \theta_{15n})$$
...
$$b_{21} = \phi_1^{-1} (\sin \theta_{21p} + \sin \theta_{21n})$$
$$b_{23} = \phi_5^{-1} (\sin \theta_{23p} + \sin \theta_{23n})$$
$$b_{25} = \phi_1^{-5} (\sin \theta_{21p} + \sin \theta_{25n})$$
...
$$b_{n1} = \phi 1^{-1} (\sin \theta_{n1p} + \sin \theta_{n1n})$$
$$b_{n3} = \phi_3^{-1} (\sin \theta_{n3p} + \sin \theta_{n3n})$$
$$b_{n5} = \phi_5^{-1} (\sin \theta_{n5p} + \sin \theta_{n5n})$$
...

Further, the symbols are given:

$$\phi_1 = \pi/n, \phi_3 = 3\pi/n, \phi_5 = 5\pi/n, \ldots$$

Then, the symbols are given:

$$\theta_{10} = \Omega_1 t + s_1(t) + s_{c1}(t)$$
$$\theta_{20} = \Omega_2 t + s_2(t) + s_{c2}(t)$$
...
$$\theta_{n0} = \Omega n t + s n(t) + s_{cn}(t)$$

Also, the symbols are given $$\theta_{11p} = (\Omega_1 + p) t + s_1(t) + s_{c1}(t)$$
$$\theta_{11n} = (\Omega_1 + 3p) t + s_1(t) + s_{c1}(t)$$
$$\theta_{13p} = (\Omega_1 + 3p) t + s_1(t) + s_{c1}(t) - (6\pi/n)(n - 1)$$
$$\theta_{13n} = (\Omega_1 + 3p) t + s_1(t) + s_{c1}(t) - (6\pi/n)(n - 1)$$
$$\theta_{15p} = (\Omega_1 + 5p) t + s_1(t) + s_{c1}(t) - (10 \pi/n)(n - 1)$$
$$\theta_{15n} = (\Omega_1 + 5p) t + s_1(t) + s_{c1}(t) - (10 \pi/n)(n - 1)$$

-continued $$\theta_{21p} = (\Omega_2 + p) t + s_2(t) + s_{c2}(t)$$
$$\theta_{21n} = (\Omega_2 + p) t + s_2(t) + s_{c2}(t)$$
$$\theta_{23p} = (\Omega_2 + 3p) t + s_2(t) + s_{c2}(t) - (6 \pi/n)(n-1)$$
$$\theta_{23n} = (\Omega_2 + 3p) t + s_2(t) + s_{c2}(t) - (6 \pi/n)(n-1)$$
$$\theta_{25p} = (\Omega_2 + 5p) t + s_2(t) + s_{c2}(t) - (10 \pi/n)(n-1)$$
$$\theta_{25n} = (\Omega_2 + 5p) t + s_2(t) + s_{c2}(t) - (10 \pi/n)(n-1)$$

...

$$\theta_{n1p} = (\Omega_n + p) t + s_n(t) + s_{cn}(t) - (2 \pi/n)(n-1)$$
$$\theta_{n1n} = (\Omega_n + p) t + s_n(t) + s_{cn}(t) - (2 \pi/n)(n-1)$$
$$\theta_{n3p} = (\Omega_n + 3p) t + s_n(t) + s_{cn}(t) - (6 \pi/n)(n-1)$$
$$\theta_{n3n} = (\Omega_n + 3p) t + s_n(t) + s_{cn}(t) - (6 \pi/n)(n-1)$$
$$\theta_{n5p} = (\Omega_n + 5p) t + s_n(t) + s_{cn}(t) - (10 \pi/n)(n-1)$$
$$\theta_{n5n} = (\Omega_n + 5p) t + s_n(t) + s_{cn}(t) - (10 \pi/n)(n-1)$$

...

Now, observing equation (7), it may be understood that a large quantity of carrier waves are synthesized. The above explanation is made of the radio signals which are transmitted from "n" mobile transceivers 100 shown in FIG. 1. When a description is made of the signals sent from the radio base station 30 to the respective mobile transceivers 100, this signal may be obtained in a similar manner. In other words, if the angular frequencies of the carrier waves are given by equation (6) as follows, the signal may be obtained.

$$\Omega_1 = \Omega_2 \ldots\ldots = \Omega_n \qquad (8)$$

The mobile transceiver 100 communicated with the radio base station 30 selectively receives only the signal required by this transceiver among the signals defined in equation (6) using the timing generator 142 and the transmission/reception connect/disconnect controller 123. Assuming now that this signal is the time slot SD1 shown in FIG. 4 with respect to the mobile transceiver 100-1, it corresponds to the first term of the right hand side in equation (6), namely the signal indicated by "I1". When the signal has passed through the amplitude controller included in the receiving unit 137 of FIG. 2, equation (5) is modified as the following equation:

$$I = A \sin(\Omega_{1t} + s_1(t) + s_{c1}(t)) \qquad (9)$$

It should be noted that symbol "A" denotes the amplitude, and has no relation to frequency or time. When the signal defined in equation (9) has passed through the frequency discriminator contained in the receiving unit 137, it will be obtained as a demodulated output:

$$e(t) = \mu(t) + \mu_c(t)$$

Then, if this demodulated output is processed in the velocity recovering circuit 131 of FIG. 2, the original signal is reproduced.

A quantitative evaluation will now be performed with respect to magnitudes of side bandwidths of radio modulated waves which may cause problems in system constructions, by which it is to be understood that the system according to the present invention can be practically operated without any problems.

(b). SPREAD IN SIDE WAVE OF MODULATED WAVE

As equation (7) represents a complex equation, the following facts can be found by observing the contents of this equation.

(i). A large quantity of subcarrier waves ($\pm p$, $\pm 3p$, $\pm 5p$, ... n, the angular frequency "$\Omega$" of carrier wave being as a center) are present at the switching angular frequency "p" of the respective time piece signal which constitutes the TCM signal used to modulate the original carrier wave. It should be noted that this influence conspicuously appears in cases where only a single time slot is used to perform signal transmission such as from the mobile transceiver 100 to the radio base station 30. The more the number of time slots is increased (i.e., the slots used when the signal is transmitted by the radio base station 30), the more the resulting influence is reduced. When the transmission is performed using all time slots, there will be no influence at all.

(ii). A large number of side band signals are present which are generated when each of the original carrier wave and of a large quantity of subcarrier waves ($\pm p$, $\pm 3p$, $\pm 5p$, ... $\pm n$, the angular frequency "$\Omega$" of carrier wave being a center) are frequency modulated in the TCM mode.

Accordingly, since the side band is largely expanded, the signal bandwidth of the radio signal indicated by equation (7) becomes very wide. Then, if the signal having such a wide bandwidth is transmitted, there will be a possibility that radio interference will occur in the adjacent radio channels. As one solution, there is a method where after the expansion of the side band is limited to a predetermined value by inserting a bandpass filter into the input side of the modulated wave, the limited side wave is supplied to the modulator. As another solution, a practical method has been proposed where the expansion of the side band is limited to a constant value by inserting a bandpass filter into the output side of the modulator. These methods have been generally utilized with not only the TCM signal, but also the radio system. Then, the modulated signal may be converted into a predetermined carrier frequency (not shown), or power of this modulated signal may be increased (not shown), and thereafter the resultant signal is transmitted via a space to the mobile transceiver 100 communicated therewith. However, if the bandpass filter has such a characteristic for restricting the expansion of the side band, distortion noise tends to occur. Thus, trade off considerations are required. In the microwave radio repeating system using a practical FDM signal (i.e., multiplex signal obtained by frequency-dividing a telephone signal), a bandpass filter having the following bandwidth is utilized. That is to say, assuming now that the maximum frequency of the FDM telephone signal (baseband signal) is equal to "$F_h$", the passband width of this bandpass filter is approximately $\pm(1.3 \text{ to } 1.5) F_h$ under the angular frequency "" of the carrier wave as a center.

On the other hand, there is no known publication concerning the passband width of a bandpass filter using a TCM processed telephone signal, by which the radio interference to adjacent channels is reduced, as well as distortion noise being reduced. It may be supposed as follows:

(a). In the case of a TCM-processed telephone signal, the bandwidth of the baseband signal is broadened so as to be similar to that of an FDM signal.

(b). Since the bandwidth of the telephone signal in a single channel has been broadened in addition to the above item (a), even if the bandwidth of the TCM-processed telephone signal is narrowed, small distortion noise is produced, as compared with that of the FDM signal. Under such circumstances, the restricted bandwidth of the radio signal by which large distortion noise is not produced, may be supposed that the minimum frequency and the maximum frequency of the TCM-processed telephone signal are selected to be "$\omega_L$" and "$\omega_H$", respectively, and also the bandwidth is selected to be $\pm(1.1$ to $1.5)$ $\Omega_H$, where the angular frequency "$\Omega$" of the carrier wave is a center (for the sake of easy calculation, it is 1.5 $\Omega_H$, but 1.2 to 1.33 are proper values). As a consequence, taking account of presence of the switching angular frequency "p" of the respective segment signals for constituting the TCM signal, the comprehensive passband width of the bandpass filter is expressed by:

$$1.5\,(\omega_m+p)\times 2 \tag{10}$$

Figure 11A:
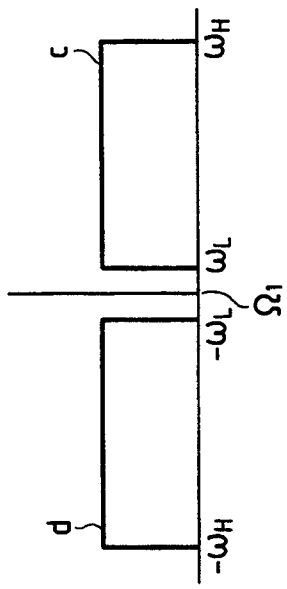
FIGS. 11(a) & 11(b) are a spectrum diagram for representing an extend of a side band of a radio signal.
Figure 11B:
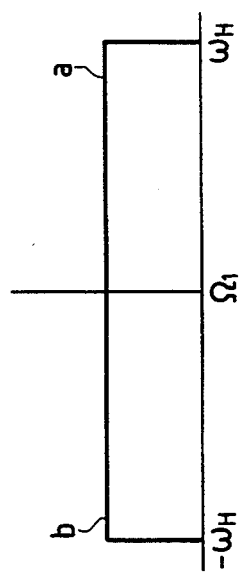

In FIG. 11(a), there is shown a spectrum of the radio signal indicated by equation (5). A description will now be made of an expansion of a side band when this signal is amplitude modulated by the telephone signal (minimum frequency "$\omega_L$" and maximum frequency "$\omega_H$") having a spectrum of FIG. 11(b) which has been TCM-processed, under the condition that a depth of modulation is $k(n<k\leq 1)$. It should be understood that FIG. 11 schematically represents these spectrums, every owned by the signal waves is indicated by power; the characteristic of the side band of the modulated wave is flat; and the energy thereof is constant over a range where the angular frequency is "0" to "$\omega_H$". FIG. 11(a) schematically represents only the first side bands "a" and "b" of the frequency modulated wave.

In this case, equation (5) will be expressed as follows:

$$I=(I_{01}/n)H(t)\{1+2\Sigma\phi_m{}^{-1}\sin\phi_m\cos mpt\}\sin\Theta_1 \tag{11}$$

where, $$H(t)=1+k(\mu(t)+\mu_c(t))$$

$$\phi_m=m\pi/n$$

and symbol "$\mu(t)$" indicates a telephone signal and symbol $\mu_c(t)$ denotes a control signal.

Although equation (11) is expressed in a complex manner, this equation may be readily understood if the following consideration is taken. That is to say, equation (11) may be produced by amplitude-modulating the right hand side of equation (7) expanded from equation (11) with, for instance, the following equation:

$$a_1=(I_{01}/n)[\sin\{(\Omega_1+s_1(t)+s_{c1}(t)\}$$

As a consequence, it seems that the expansion of the side band owned by the composite-modulated radio signal furthermore becomes large in addition to the expansion as defined by equation (7). However, practically speaking, the expansion of the side band does not become large, but is substantially equal to the expansion of the side band which exists in the ordinally single-modulated radio signal.

Now, this reason will be theoretically explained. First, assuming now that the right hand side of equation (11) is expanded using a slight approximation, it can be given as follows:

$$I=(1+a+b)(c+d)\sin\Omega_1 t \tag{12}$$

where, a: upper band in amplitude-modulated wave
b: lower band in amplitude-modulated wave
c: upper band in frequency-modulated wave
d: lower band in frequency-modulated wave $\sin\Omega_1 t$: radio carrier wave: radio carrier wave Then, if the right hand of equation (12) is expanded, it follows that:

$$I=(c+d)\sin\Omega_1 t+(a+b)(c+d)\sin\Omega_1 t \tag{13}$$

The first term of the right hand side of equation (13) indicates the frequency-modulated wave itself, and it is to be understood that only this term does not cause expansion of the side band. Subsequently, when the second term of the right hand side of equation (13) is further expanded, it is given as follows:

$$r=ac+ad+bc+bd \tag{14}$$

It should be noted that the term of the radio carrier wave has been omitted from equation (14).

Angular frequency modulated side-band distributions of the respective terms in the right hand side of equation (14) will now be analyzed. As is apparent from FIGS. 11(a) and 11(b), since the distributions are equal to a product of two side bands, this distribution has similar effects as the "convolution" as described in the statistics.

Figure 13:
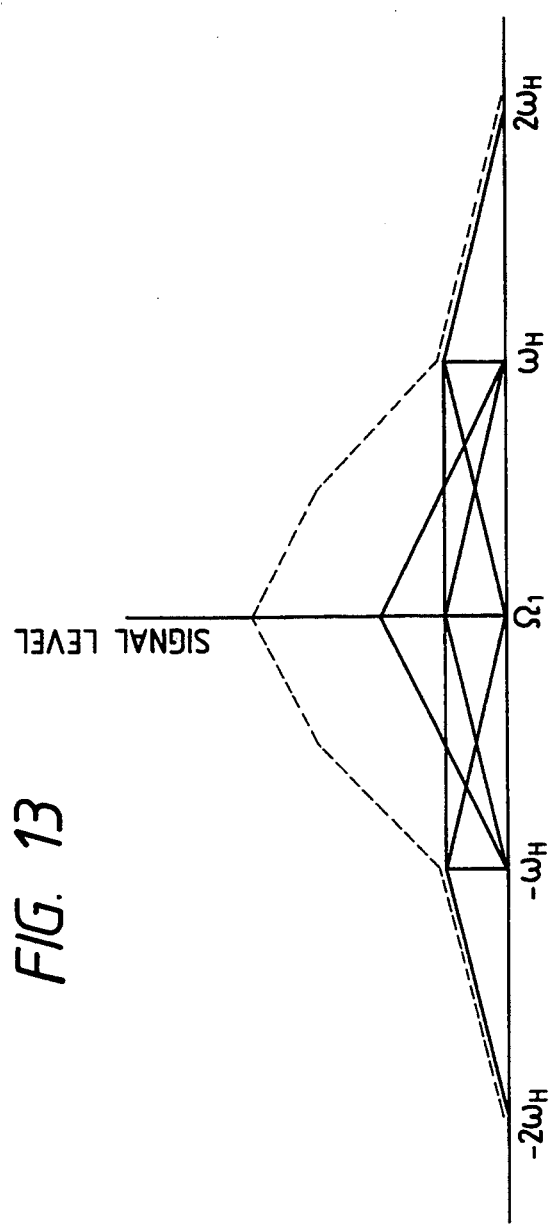
FIG. 13 is a spectrum diagram for showing a distribution of a hybrid modulation wave in the radio signal.

In FIG. 13, various side bands a, b, c and d are shown as (a-1) to (d-1) and (a-2) to (d-2), and also products of the side bands ac, ad, bc, and bd are indicated as (a-3) to (d-3). It should be noted that the side band of the amplitude modulated wave is also flat between $-\omega_H$ and $\omega_H$. It is understood from FIG. 12 that the respective signal components of the products ac, ad, bc, bd of the side bands are given as follows:

ac: A major signal component is present at the upper portion 0 ($=\Omega_1$) to $2\omega_H$ of the angular frequency $\Omega_1$ of the carrier wave (a-3).

ad: A major signal component is present in the lower part ($\omega_L$) and the upper part ($\Omega_H$), which sandwich the angular frequency $\Omega$ of the carrier wave (b-3).

bc: A major signal component is present in the lower part ($\omega_L$) and the upper part ($\omega_H$), which sandwich the angular frequency ($\Omega_1$) of the carrier wave (c-3).

bd: A major signal component is present in the lower part 0 ($-\Omega_1$) to $2_H$ of the angular frequency D1 of the carrier wave (d-3).

As a result of the above description, the distribution of the composite modulated wave in the right hand side of equation (12) is represented in FIG. 13. It should be noted that the solid line in FIG. 12 indicates the various side bands and the products thereof, whereas the dotted line indicates the distribution of a side wave of the composite-modulated wave having the angular frequency $\Omega_1$ of the carrier wave as a center thereof.

The signal components of FIG. 13 are subdivided into $-2WH$ to $\omega_H$, $-\omega_H$ to $\omega_H$ and $\omega_H$ to $2\Omega_H$. The power ratios of these signal components will now be calculated.

a). The signal components existing in the part $-\omega_H$ to $\omega_H$ are:
power of carrier wave: 50%
power of side wave: 42% b). The signal components existing outside the part $-\omega_H$ to $\omega_H$ are equal to 8% because of the remaining power related to the item a).

As a result, even when the upper limit ($\omega_H$) of the primary side wave in the case of a single modulated wave is selected to be the cut-off frequency of the bandpass filter, it is clear that a power having 92% of the composite modulated wave is retained.

Subsequently, when a calculation is made of the signal components present within the part 1.5 ($-\omega_H$ to $\omega_H$) under such conditions that the cut-off frequency of the bandpass filter is set to a high frequency, whereby the signal can be transmitted up to a frequency band 1.5 times higher than the frequency band WH (namely, 1.5 $\omega_H$) a resultant signal component of 98% is obtained. Accordingly, the signal component present outside the above-described band becomes 2%. As a consequence, it is apparent that most of the signal components are present within the portion 1.5 ($-\omega_H$ to $\omega_H$)

It should be noted that the above-described calculations are satisfied based on the assumption that the characteristic of the side band of the modulated wave is flat. However, as is known in the art, the spectrum of the human voice is concentrated at a lower frequency band.

Figure 14:
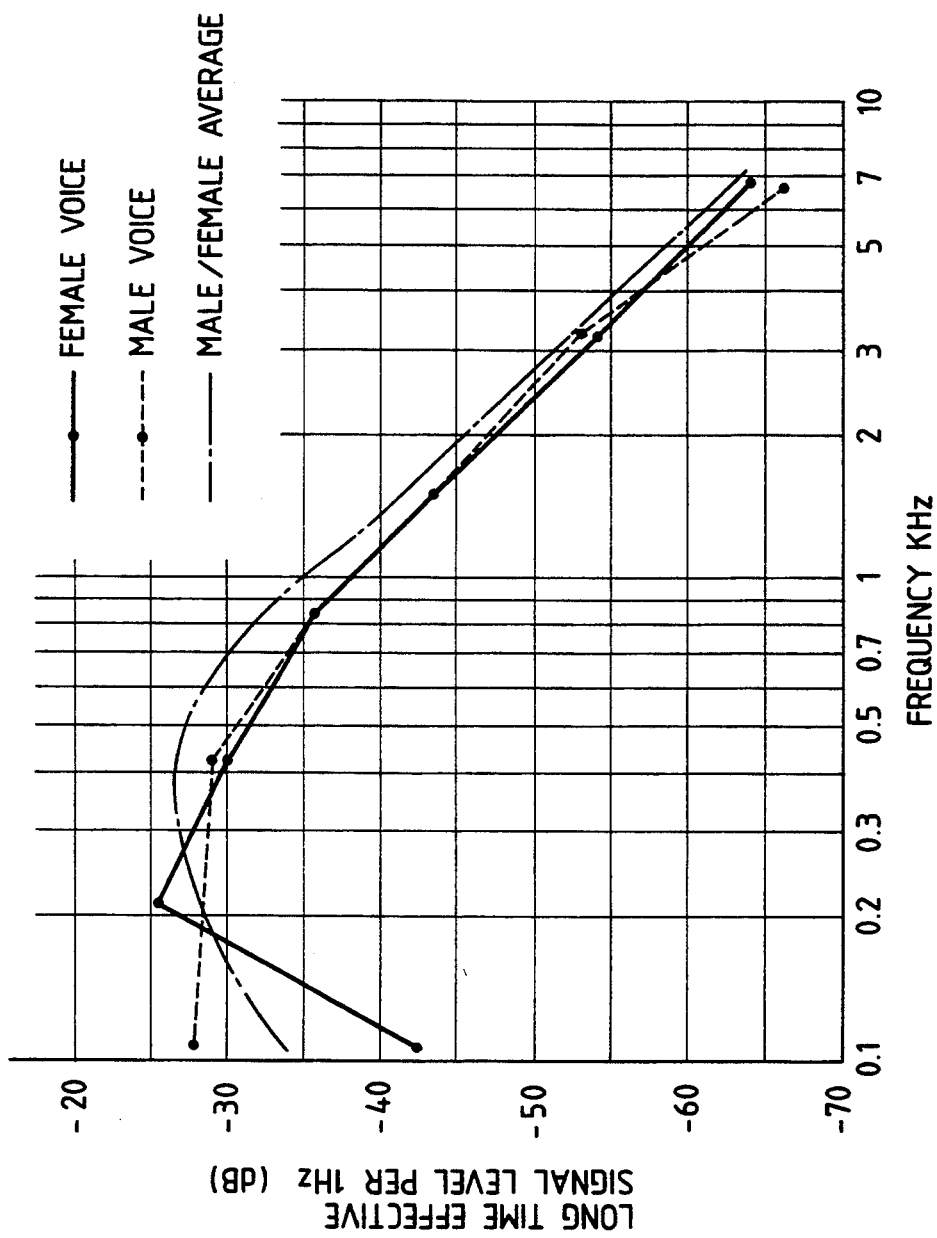
FIG. 14 is a spectrum diagram for representing a speech spectrum of a human conversation.

FIG. 14 shows one example of a spectrum related to human voices. In this figure, a solid line indicates a female voice, a dotted line represents a male voice and a dot/dash line denotes an averaged frequency distribution thereof. It is apparent that a long time signal level (dB) per 1 Hz is concentrated to a low-frequency portion. As a consequence, the frequency characteristic of the telephone signal also represents the frequency characteristics under the conditions that the frequencies lower than the low-frequency band of 0.3 kHz and also higher than the high-frequency band of 3 kHz are cut off (see FIG. 14). Therefore, it is seen that the spectrum of the telephone signal is also concentrated at the low frequency band, and a long time effective value thereof is lowered to approximately 25 dB around the high frequency (3 kHz) region, as compared with the low frequency region (0.3 kHz). This may be similarly applied to such a TCM-processed telephone signal. When a calculation similar to the above-described calculation is performed using the side band characteristic shown in FIG. 14, the following results are obtained.

c). When the signal component present within the transmission band of 1.5 ($-\omega_H$ to $\omega_H$) is calculated, the resultant power more than 99.9% is obtained.

d). Since the signal components present outside the transmission band of 1.5 ($-\omega_H$ to $\omega_H$) are equal to the remaining value, the resultant power becomes 0.1%.

Even if the signal component calculation is carried out within the transmission band of 1.33($-\omega_H$ to $\omega_H$), the resultant power becomes 99% or more. In other words, it becomes apparent from the foregoing descriptions that the necessary transmission band width of the composite modulated wave is sufficiently given as follows:

$$V_{fm-am} = 1.33 \, \omega_H \tag{15}$$

Also, this result implies that a bandpass filter is not required. This result also indicates that even if a bandpass filter having a bandpass characteristic narrower than that of the above bandpass filter is used so as to avoid interference occurring in adjacent channels, no specific adverse influence results to the transmission characteristics.

The above-described results are for the case where a TCM telephone signal is transmitted from the radio base station 30. A description will now be made of the case where, if the TCM telephone signal is sent out from the mobile transceiver 100, the modulated signals are furthermore concentrated to the signals near the carrier wave. In this case, only the signal indicated by, for instance, the first term $(I_{01}/n)C_1$ of the right hand side of equation (7) is transmitted toward the radio base station 30. As is apparent from the first term of the right hand side of equation (7), the TCM-processed telephone signal is spread on the frequency axis. That is to say, there are equivalently a large quantity of subcarriers ($\pm p$, $\pm 3p$, $\pm 5p$, ..., angular frequency $\Omega_1$ of carrier being a center) because of the switching angular frequency "p" of the time segment signal constituting the TCM signal, and then the TCM-processed telephone signal is spread on the frequency axis by many of these subcarriers. For example, assuming that the switching angular frequency "p" is equal to 50 Hz($=2\times 50$), the first subcarrier wave has a $\frac{1}{3}$ amplitude as compared to that of the main carrier wave at both sides ($+2\times 50$) of the angular frequency $-\Omega_1$ of the carrier wave. When the subcarrier waves $\pm 3p$, $\pm 5p$ are 50 Hz, these subcarrier waves have 1/5, 1/7 the amplitudes of that of the main carrier wave, respectively, and the subcarrier wave has 1/120 the amplitude of that of the main carrier wave near 3 kHz. However, in the actual radio circuits, when the carrier wave is modulated by a TCM telephone signal, the high frequency components have been previously removed by the bandpass filter, and then the basic wave component is amplified. As a consequence, the energy of the modulated signal becomes considerably low near $\pm 3$ kHz, and is concentrated around the carrier wave.

(C). CALCULATION ON FREQUENCY UTILITY RATIO

Next, spreads in side waves in cases where the above-described single modulation has been performed, but the hibrid modulation according to the present invention has not been executed, will be explained, and thereafter the two cases are compared.

An explanation will now be given of the case where a carrier wave is frequency-modulated with two TCM-processed telephone signals, and a maximum frequency of a signal contained in the TCM-processed hybrid signal is equal to 1.33 ($\Omega_H + p$). As a consequence, a required band width of a modulated wave is given as follows:

$$B_{2fm} = 1.33 \, (\Omega_H + p) \tag{16}$$

A comparison between equation (15) and equation (16) is then performed. Assuming now that since "p" is smaller than "$\omega_H$", and that "p" is negligible, it is apparent that equation (15) is smaller than equation (16), and is equal to about a half thereof. In other words, the frequency utility ratio of the present invention is about two times higher than that of the conventional frequency utility ratio.

Based upon the above-described explanations, it can be shown that the frequency utility ratio of the present invention is greater than the conventional frequency utility ratio. Then, if the TCM process is performed without increasing the compression ratio of the signal, since the time slot length is prolonged and thus an amount of transmittable information is lowered, a direct comparison cannot be made. Thus, when the amount of information about a signal to be hybrid-modulated is reduced, eventually the comparison result obtained is identically the same as the comparison result between equations (15) and (16). As a consequence, also in this case, it can be shown that the frequency utility ratio according to the present invention is greater than the conventional frequency utility ratio.

The hybrid modulation explained above corresponds to a combination between frequency modulation and amplitude modulation. There are other possibilities for hybrid modulation such as a combination between frequency modulation and frequency modulation, or a combination between amplitude modulation and amplitude modulation. It should be noted in this case that special care should be taken so as not to mutually overlap the signal frequency bands.

(3). SYSTEM STRUCTURE IN THE CASE OF HYBRID SIGNAL

A system structure and an operation thereof when a hybrid-modulated signal is used will now be described, where the hybrid-modulated has been amplitude/frequency modulated by a telephone signal.

Figure 15A:
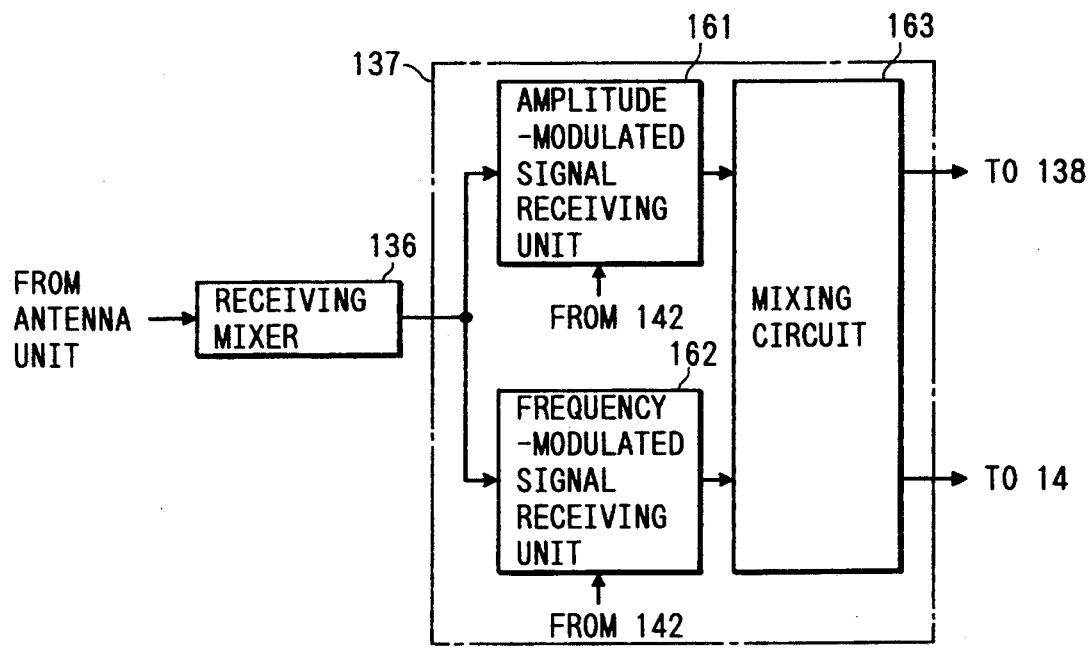
FIGS. 15(a) & 15(b) are a detailed circuit arrangement of a receiving unit as a constructive element of the mobile transceiver shown in FIG. 2 and also a radio receiving circuit as a constructive element of the radio base station shown in FIG. 3.
Figure 15B:
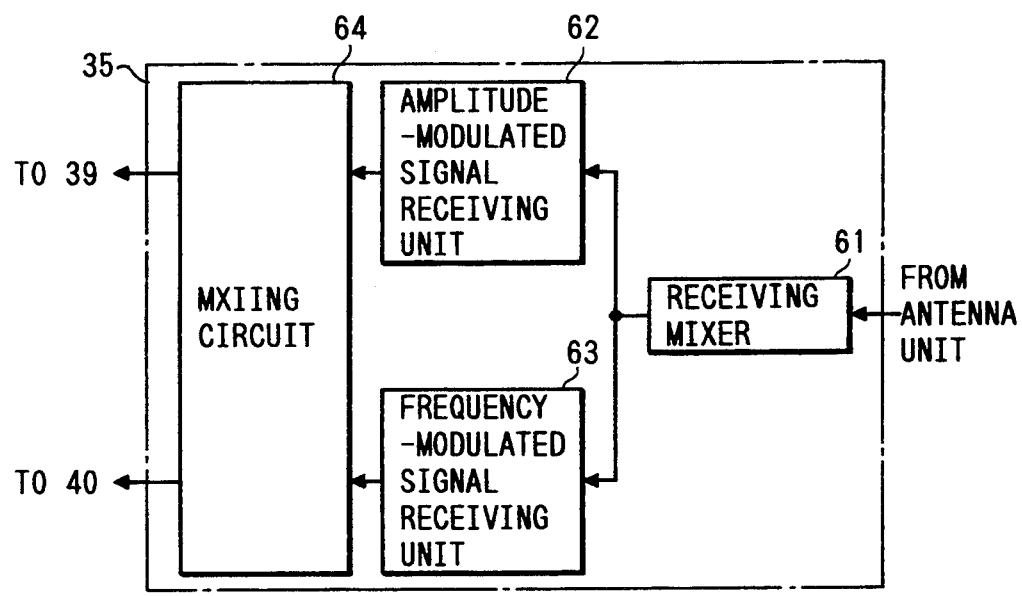

In FIGS. 15 to 17, detailed arrangements of the receiving unit 137 (FIG. 15a) contained in the mobile transceiver 100 and the radio base station 30 are shown. The radio receiving circuit 35 (FIG. 15b), the radio transmitting circuit 32 (FIG. 16) and the radio transmitting circuit 32B (FIG. 17) are also illustrated in order to explain an embodiment of the present invention. With regard to FIGS. 15 to 17, different points corresponding to those shown in FIGS. 2 and 3 will be explained.

FIG. 15 (a) shows a detailed circuit arrangement of the receiving unit 137 of the mobile transceiver 100. The radio hybrid modulated signal received by the antenna unit is supplied via the receiving mixer 136 to the receiving unit 137, and then divided into two signal portions. One signal portion is supplied to an amplitude-modulated signal receiving unit 161 operable in response to the timing signal derived from the timing generator 142, whereas the other signal portion is input to a frequency-modulated signal receiving unit 162 similarly operable in response to a timing signal derived from the timing generator 142. Thereafter, the radio hybrid modulated signal received by the antenna unit is supplied via the receiving mixer 136 to the receiving unit 137, and then divided into two signal portions. One signal portion is supplied to an amplitude modulated signal receiving unit 161 operable in response to the timing signal derived from the timing generator 142, whereas the other signal portion is input to a frequency-modulated signal receiving unit 162 similarly operable in response to a timing signal derived from the timing generator 142. Thereafter, these output signals are input to a mixing circuit 163. The mixing circuit 163 has functions which measure a quality (S/N) ratio of the input signal, to select only the signal having the higher S/N ratio, or to mix two signals with each other in accordance with the S/N ratios. The output from the mixing circuit 163 is divided into two signal positions. One signal portion is input into the signal time expansion circuit 138, and the other signal portion is input into a clock regenerator 142 (see FIG. 2).

FIG. 15(b) represents a detailed circuit arrangement of the radio receiving circuit 35 in the radio base station 30. After the signal received by the antenna unit of the radio base station 30 has passed through the receiving mixer 61, this signal is subdivided into two signal portions. One signal portion is input to the amplitude-modulated signal receiving circuit 62, whereas the other signal portion is input to the frequency-modulated signal receiving unit 63. Thereafter, these output signals are input to the mixing circuit 64. The mixing circuit 64 functions to measure a quality (S/N ratio) of the input signal, to select only the signal having the higher S/N ratio, or to mix both of these signal portions with each other, depending upon the S/N ratios. The output from the mixing circuit 64 is divided into two signal portions. One signals portion is input into the signal selecting circuit group 39, whereas the other signal portion is input to the control unit 40 (see FIG. 3).

FIG. 16 indicates an internal arrangement of the radio transmitting circuit 32, in which there is a carrier frequency source 37 at a left portion thereof, and the carrier wave generated from this source is input into the frequency modulator 36. On the other hand, the signal from the signal allocating circuit group 52 is input into the frequency modulator 36 operable under control of the control unit 40. Then, the carrier wave becomes a frequency-modulated wave. Subsequently, this frequency-modulated wave is input into the amplitude modulate 34 operable under control of the control unit 40, in which the frequency-modulated wave is amplitude-modulated, and also the signal from the signal allocating circuit group 52 has been input. As a result, the frequency-amplitude composite modulation is completed. Then, this radio composite modulated wave is input into the transmitting mixer 33. Thereafter, once this modulated wave has been amplified by a power amplifier (not shown), the amplified composite modulated signal is transmitted through the antenna unit to a large quantity of mobile transceivers 100.

FIG. 17 represents an internal arrangement of the radio transmitting circuit 32 according to another preferred embodiment. F32B of the present invention. In FIG. 17, there are two carrier frequency sources 37-1 and 37-2 at a left portion thereof, which output carrier waves having angular frequencies $\Omega_a$, $\Omega_b$, respectively. The carrier wave from this carrier frequency source 37-1 is input into a frequency modulator 36 operable under control of the control unit 40, whereby this input carrier wave is frequency-modulated by the signal from the signal allocating circuit group 52. On the other hand, the carrier wave from the carrier frequency source 37-2 is input to an amplitude modulator 34 operated under control of the control unit 40, whereby this carrier wave is amplitude-modulated by the signal from the signal allocating circuit group 52. Two signals output from the two modulators are input into the transmitting mixer 33, in which the output frequency are converted into $\Omega_1 = \Omega_a + \Omega_b$, and at the same time, the hybrid modulated wave which has been frequency/amplitude-modulated is output.

The above description relates to hybrid modulation performed in radio base station 30. Similarly, the telephone signal may be hybrid-modulated in the radio transmitting circuit 132 of the mobile transceiver 100, and the hybrid modulated signal transmitted to the radio base station 30.

In the previously explained transmission diversity system, the phase of the TCM-processed telephone signal is not taken into account when the composite modulation is carried out. However, there are some cases that adverse influences in signal deterioration result when the radio signals are propagated through a space, and become equal, depending upon the system parameters. In this case, it is possible to obtain a time diversity effect (about 5 to 10 dB) by delaying either the amplitude-modulated signal, or the frequency-modulated signal using a delay circuit a delay time of 10 to 100 m second Furthermore, in the above-explained transmission diversity system, there are several cases where the modulated sideband characteristic of the hybrid-modulated wave applied to the transmission antenna may be expanded, as compared with the side band characteristic of single modulated wave, depending upon the system parameters. In this case, after the hybrid-modulated wave has been obtained, the sideband characteristic of this hybrid-modulated wave is reduced in such a manner that it may have such a modulated sideband characteristic which is equal to that obtained by amplitude-modulating one carrier wave with the same modulating signal, or by angle modulating this carrier wave by way of a bandpass filter. Thereafter, the resultant hybrid-modulated wave is sent out, whereby an increase in the radio interference to the adjacent ratio channels is negligible.

As is apparent from the foregoing descriptions, in the modulation system according to the present invention, hybrid modulation is employed so that the same carrier wave is angle-modulated using a TCM-processed telephone signal, and at the same time, is amplitude-modulated with the same TCM-processed telephone signal, whereby a diversity effect can be simultaneously obtained while effectively utilizing the frequencies.

Also, depending upon the types of signals, there are certain possibilities that the expansion of the sideband in the hybrid modulated signal becomes greater than that of a single modulated signal. In this case, a bandpass filter is employed at the output side of the hybrid modulated signal, whereby the expansion of this sideband may be suppressed to an expansion level of the same level as a sideband of a single signal which has been angle-modulated or amplitude-modulated. As a consequence, the radio interference to the adjacent channels can be prevented, and also the frequencies can be effectively utilized.

What is claimed as new and desired to be secured by Letters Patent of the United States is:

1. A method for providing diversity communication of a time-division, time-compressed multiplexing telephone signal for a mobile communication system having a plurality of radio base station means for covering a plurality of zones constituting service areas, and gateway switching means for switching communications between each of said plurality of radio base station means and each of a plurality of mobile radio means, wherein said plurality of mobile radio means use a radio channel through which signals segmented and temporally compressed into time slots of frame structures, are transmitted in order to thereby communicate with each of said plurality of radio base station means, and wherein said plurality of mobile radio means travel between said plurality of zones, said method comprising the steps of:

performing amplitude modulation and angle modulation of a single carrier wave using said temporally compressed and segmented signals to thereby generate a hybrid-modulated signal which has been both amplitude-modulated and angle-modulated;

transmitting said generated hybrid-modulated signal; and performing at least one of amplitude demodulation and angle demodulation on the hybrid-modulated signal.

2. A method for providing diversity communication for a time-division mobile communication system, as claimed in claim 1, comprising the further step of:

delaying one of the amplitude-modulated signal and angle-modulated signal after said hybrid-modulated wave is generated and transmitted, in order to thereby achieve a time diversity effect.

3. A method for providing diversity communication in a time-division mobile communication system as claimed in claim 1, wherein a bandwidth of said temporally compressed and segmented signal is substantially equal to a bandwidth of a modulated signal obtained from one of said amplitude-modulated signal and said angle-modulated signal.

* * * * *